US012735224B1

(12) United States Patent
Cifers, III et al.

(10) Patent No.: US 12,735,224 B1
(45) Date of Patent: Sep. 15, 2026

(54) FISHING CRATE AND COMPONENTS, ACCESSORIES AND MOUNTS THEREFOR

(71) Applicant: YakAttack, LLC, Farmville, VA (US)

(72) Inventors: Luther Cifers, III, Farmville, VA (US); Kenneth P. Green, Lunenburg, VA (US); Joey Martin Pruitt, Appomattox, VA (US); John Aubrey Hipsher, Farmville, VA (US)

(73) Assignee: YakAttack LLC, Farmville, VA (US)

( * ) Notice: Subject to any disclaimer, the term of this patent is extended or adjusted under 35 U.S.C. 154(b) by 83 days.

(21) Appl. No.: 18/805,481

(22) Filed: Aug. 14, 2024

Related U.S. Application Data

(62) Division of application No. 18/298,199, filed on Apr. 10, 2023, now Pat. No. 12,227,331.
(Continued)

(51) Int. Cl.
*B65D 25/28* (2006.01)
*B65D 6/08* (2006.01)
(Continued)

(52) U.S. Cl.
CPC .......... *B65D 11/1873* (2013.01); *B65D 11/14* (2013.01); *B65D 25/02* (2013.01);
(Continued)

(58) Field of Classification Search
CPC ............ B65D 11/1873; B65D 11/1866; B65D 25/02; B65D 25/20; B65D 25/2808; B65D 43/165; B65D 43/164; B65D 43/163; B65D 45/24; B65D 21/0201; B65D 21/0224; B65D 21/0217; B65D 21/0233; B65D 21/0209; B65D 43/24; B65D 45/20; B65D 45/16; B65D 25/22; B65D 25/2867; B65D 2525/281; B65D 2251/1058; B65D 2525/285; B65D 2543/00194; B65D 2543/00296; A01K 1/0245; A01K 97/06; A01K 97/00; A01K 97/10
USPC .... 220/4.32, 4.33, 4.28, 844, 843, 836, 676, 220/607, 675, 669, 23.4, 23.2, 23.89, 220/23.87, 23.88, 23.83, 4.27, 4.26, 845, 220/810; 119/452, 499, 498; 206/510, 206/509, 504
See application file for complete search history.

(56) References Cited

U.S. PATENT DOCUMENTS 3,327,882 A * 6/1967 Andrews ................ B65D 90/06 220/592.25
3,410,441 A * 11/1968 Rhyne ................. A47B 88/941 312/263
(Continued)

*Primary Examiner* — Robert J Hicks
(74) *Attorney, Agent, or Firm* — Thedford I. Hitaffer; Hitaffer, PLLC

(57) ABSTRACT

A crate has an arrangement of fastening holes for mounting crate components, as well as various mounts and accessories to the outer and inner surface of the crate. The fastening holes are blind holes that do not breach, penetrate or pass-through panels defining the crate so that the crate remains watertight or sealed or leakproof. The fastening holes may be arranged to provide points of intersection for rules or guides that define a grid to aid in mounting components, mounts and accessories at desired locations. Outer fastening holes are provided in a repeating pattern and superimposed on inner fastening holes. The fastening holes provide for ease of customization without the need for drilling.

13 Claims, 30 Drawing Sheets

Related U.S. Application Data

(60) Provisional application No. 63/478,910, filed on Jan. 6, 2023.

(51) Int. Cl.

*B65D 6/24* (2006.01)
*B65D 25/02* (2006.01)
*B65D 25/20* (2006.01)
*B65D 43/16* (2006.01)
*B65D 45/24* (2006.01)
*A01K 97/06* (2006.01)
*A01K 97/10* (2006.01)

(52) U.S. Cl.

CPC ......... *B65D 25/20* (2013.01); *B65D 25/2808* (2013.01); *B65D 43/165* (2013.01); *B65D 45/24* (2013.01); *A01K 97/06* (2013.01); *A01K 97/10* (2013.01); *B65D 2251/1058* (2013.01); *B65D 2525/285* (2013.01); *B65D 2543/00194* (2013.01); *B65D 2543/00296* (2013.01)

(56) References Cited

U.S. PATENT DOCUMENTS

| | | | | |
|---|---|---|---|---|
| 9,671,060 | B1 * | 6/2017 | Cifers | F16M 13/02 |
| 9,828,073 | B1 * | 11/2017 | Cifers, III | B60R 11/00 |
| 9,863,576 | B1 * | 1/2018 | Cifers | F16M 11/2085 |
| 9,879,819 | B1 * | 1/2018 | Cifers | F16M 11/2085 |
| 10,435,117 | B1 * | 10/2019 | Cifers | F16M 11/425 |
| 10,900,607 | B1 * | 1/2021 | Newman | F16B 7/00 |
| 10,967,939 | B1 * | 4/2021 | Cifers, III | B60R 11/00 |
| 11,333,298 | B1 * | 5/2022 | Newman | F16M 11/043 |

* cited by examiner 170
212
14
14
13
13

170
178
180
176
102

170
204
210
102

234
236
254
250

254
250
236

170
234
242
244
236
102

308
324
322
350

308
324
310
322
311
312

316
318
320
308
311
102
308
122

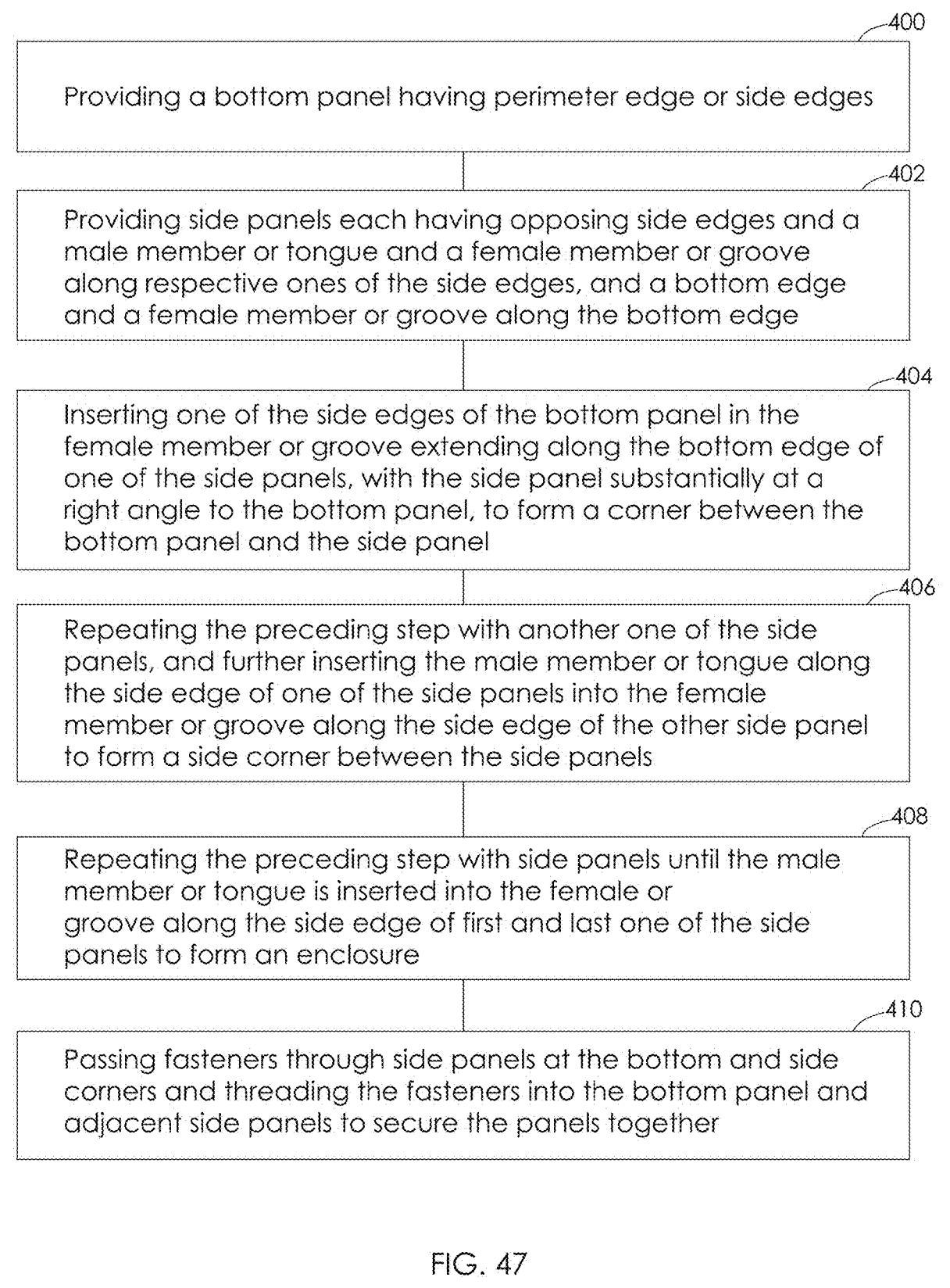

400

Providing a bottom panel having perimeter edge or side edges

402

Providing side panels each having opposing side edges and a male member or tongue and a female member or groove along respective ones of the side edges, and a bottom edge and a female member or groove along the bottom edge

404

Inserting one of the side edges of the bottom panel in the female member or groove extending along the bottom edge of one of the side panels, with the side panel substantially at a right angle to the bottom panel, to form a corner between the bottom panel and the side panel

406

Repeating the preceding step with another one of the side panels, and further inserting the male member or tongue along the side edge of one of the side panels into the female member or groove along the side edge of the other side panel to form a side corner between the side panels

408

Repeating the preceding step with side panels until the male member or tongue is inserted into the female or groove along the side edge of first and last one of the side panels to form an enclosure

410

Passing fasteners through side panels at the bottom and side corners and threading the fasteners into the bottom panel and adjacent side panels to secure the panels together

FIG. 47

FISHING CRATE AND COMPONENTS, ACCESSORIES AND MOUNTS THEREFOR

CROSS-REFERENCE TO RELATED APPLICATIONS

This application is a divisional of U.S. patent application Ser. No. 18/298,199, filed Apr. 10, 2023, issued as U.S. Pat. No. 12,227,331 on Feb. 18, 2025, which claims priority to U.S. Provisional Patent Application No. 63/478,910, filed on Jan. 6, 2023, the disclosure of which is incorporated herein by reference in its entirety.

BACKGROUND OF THE INVENTION

This invention relates in general to crates or containers, particularly for holding fishing tackle and the like.

SUMMARY OF THE INVENTION

This invention relates to a crate comprising side panels each comprising a tongue along one side edge and a groove along an opposing side edge. The tongue of each one of the side panels cooperates with the groove on an adjacent one of the side panels so that the side panels may be successively joined together to form a perimeter wall of the crate.

Various advantages of this invention will become apparent to those skilled in the art from the following detailed description of the preferred embodiment, when read in light of the accompanying drawings.

BRIEF DESCRIPTION OF THE DRAWINGS

FIG. 47 is a flow diagram of a method for assembling a portion of the crate.

DETAILED DESCRIPTION OF THE PREFERRED EMBODIMENT

Figure 1:
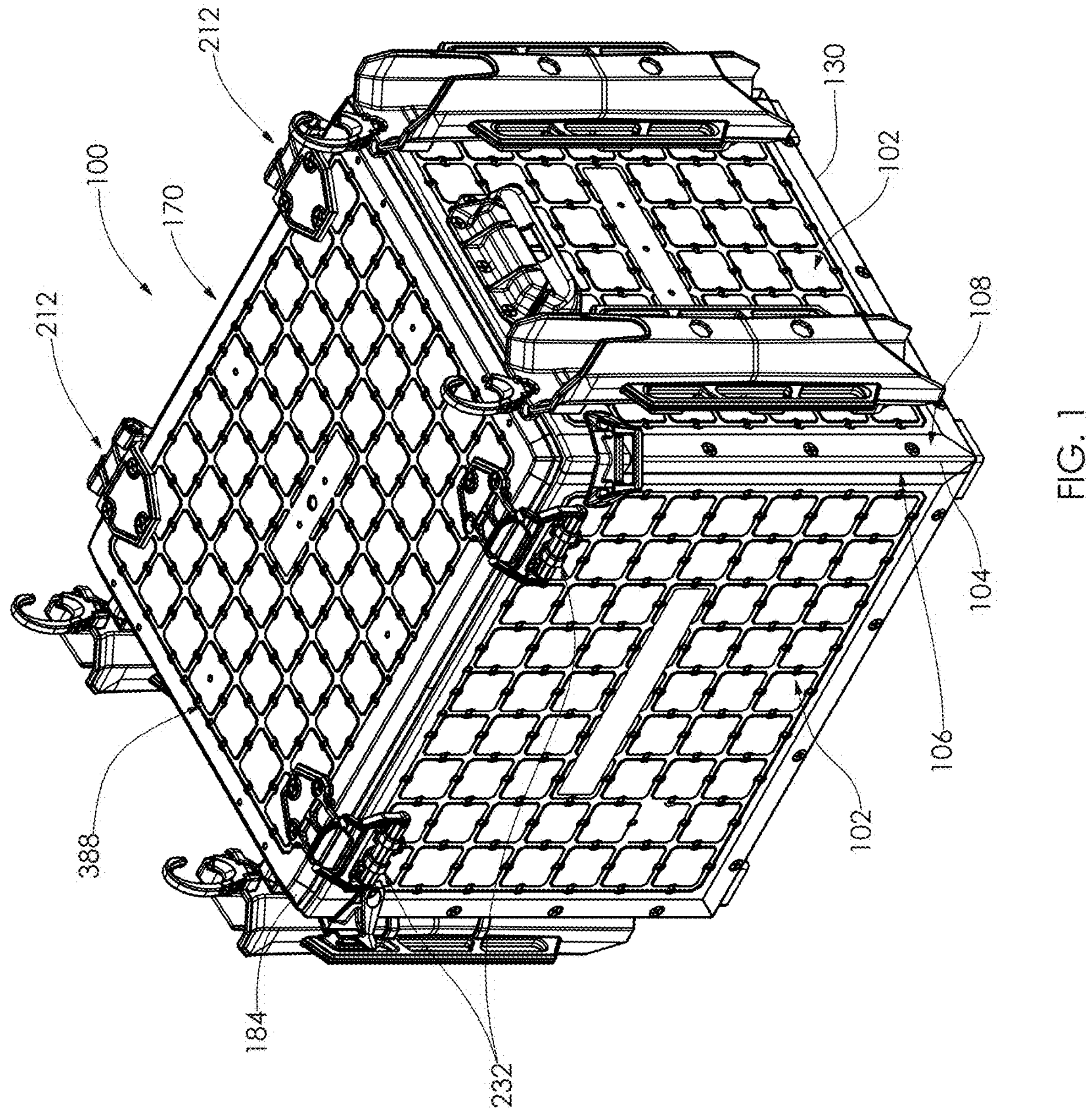
FIG. 1 is an environmental top perspective view of a crate, with an exemplary configuration of rod holders and corner bracket mounted thereto.

Referring now to the drawings, there is illustrated in FIG. 1 a crate 100 in the form of a box-shaped container used for transporting and storing fishing tackle or gear. The crate 100 may be comprised of four side panels 102 that interface alongside corners 104 of the crate 100 along adjacent side edges 106, 108 of adjacent side panels 102.

Figure 2:
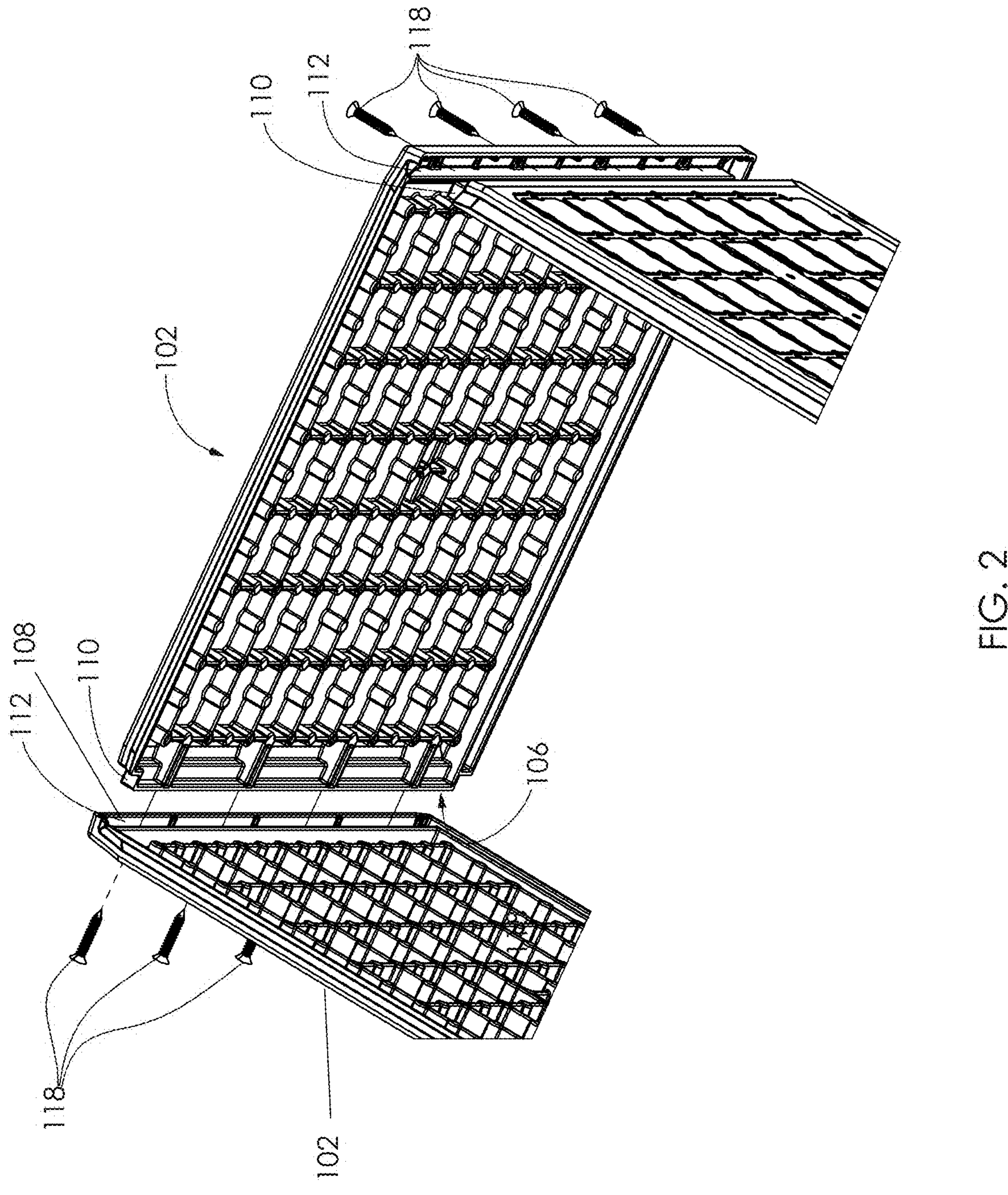
FIG. 2 is a perspective view of side panels of the crate, in relevant part, showing an inner surface thereof and cooperating portions of side edges thereof.

As shown in FIG. 2, a first side edge 106 of each side panel 102 may have a male member, such as a keyed edge or tongue 110, that may extend the length of the first side edge 106. A second side edge 108 of each side panel 102 may have a female member, such as a pocketed member or groove 112 that may extend the length of the second side edge 108.

Figure 3:
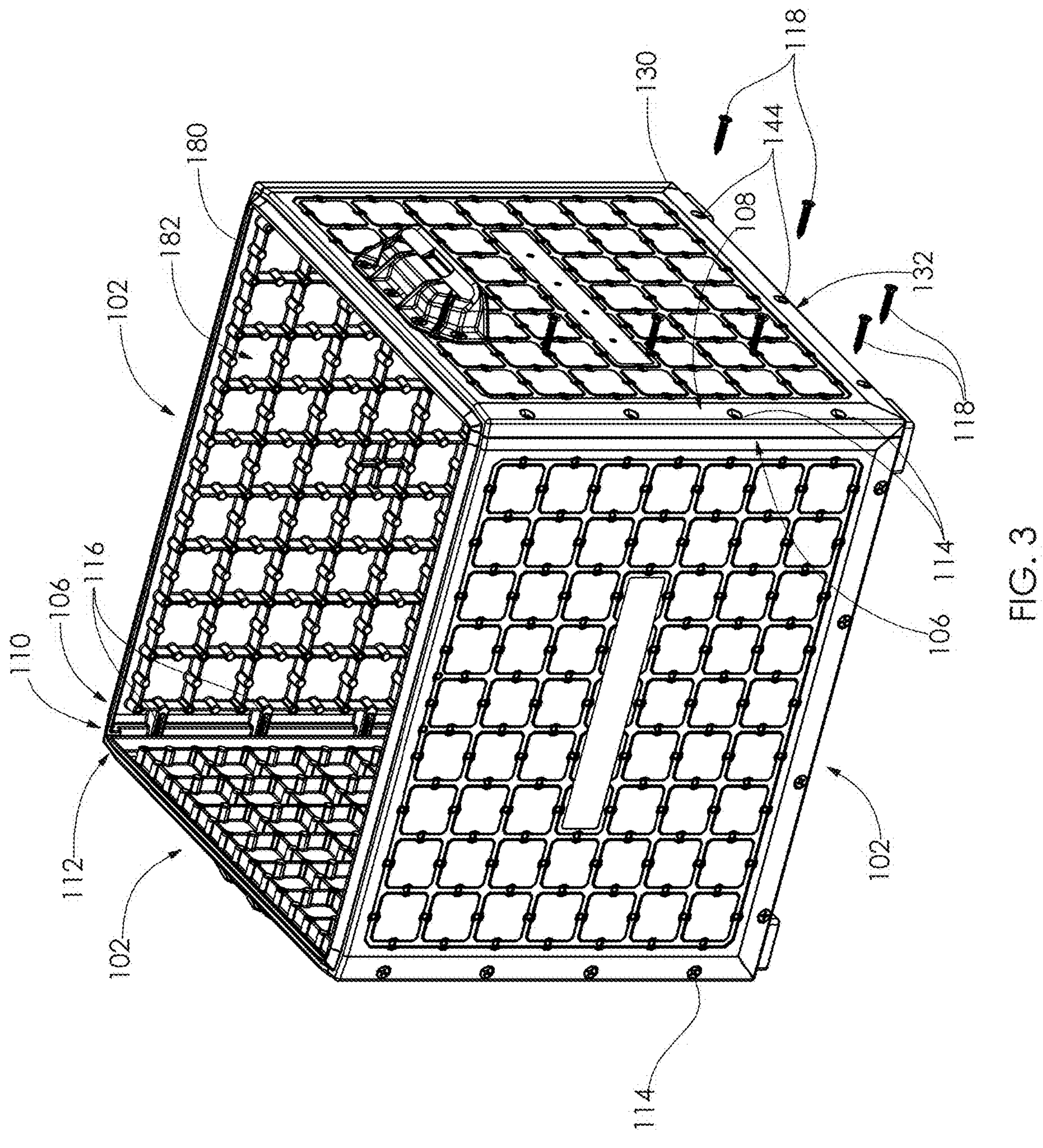
FIG. 3 is a perspective view of the crate partially assembled, with the lid thereof removed, and with fasteners exploded therefrom.

As shown in FIG. 3, the tongue 110 of one side panel 102 may be inserted into the groove 112 of another adjacent side panel 102 so that the two side panels 102 cooperate in an interlocking fashion, for example, in a snug fit male and female connection or relationship. One of the side edges 108 may be provided with one or more through holes 114 and the other side edge 106 may be provided with one or more threadable structures 116 (e.g., bores, troughs, channels, or other suitable structures) (like those shown on an opposite side on an opposing side panel for convenience) that each align with a corresponding one of the through holes 114. A screw 118, such as a self-threading screw, may pass through or be threaded through the holes 114 and thread into a corresponding one of the threadable structures 116 to secure adjacent edges 106, 108 of adjacent side panels 102 together. The holes 114 are preferably countersunk holes and the screws 118 are preferably flush-mount flat head screws having a tapered head that fits in the countersunk holes 114 so that the heads of the screws 118 are flush with an outer surface of the side panels 102. It should be appreciated that by providing one side edge 106 of each side panel 102 with a tongue 110 and another side edge 108 of each side panel 102 with a groove 112, four identical side panels 102 may be assembled together, instead of having two sides with tongues and two side with grooves, to reduce tooling and fabrication of side component part. It should also be appreciated that the male and female connection may form a watertight (e.g., water resistant or waterproof) connection between adjacent side edges 106, 108 of adjacent side panels 102. It should further be appreciated that the crate 100 need not be formed from four side panels 102 [ ] but instead may be comprised of fewer or more sides, such as, for example, three sides to form, for example, a triangular shaped crate, or eight sides, to form, for example, an octagonal shaped crate, instead of a square or rectangle crate 100 having four side panels 102.

Figure 5:
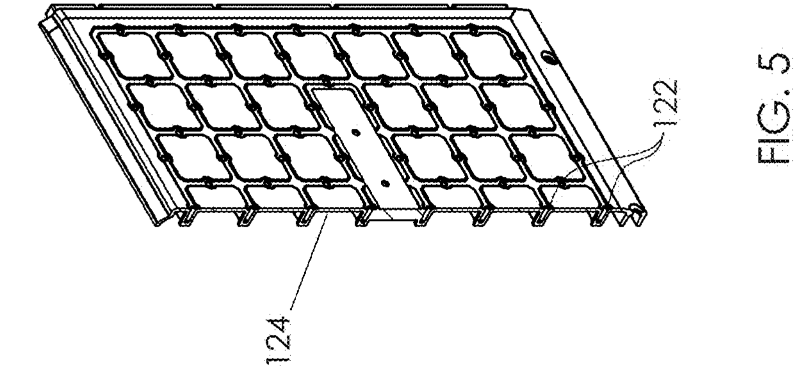
FIG. 5 is a cross-sectional perspective view of the side panel taken along the lines 5-5 in FIG. 4.
Figure 4:
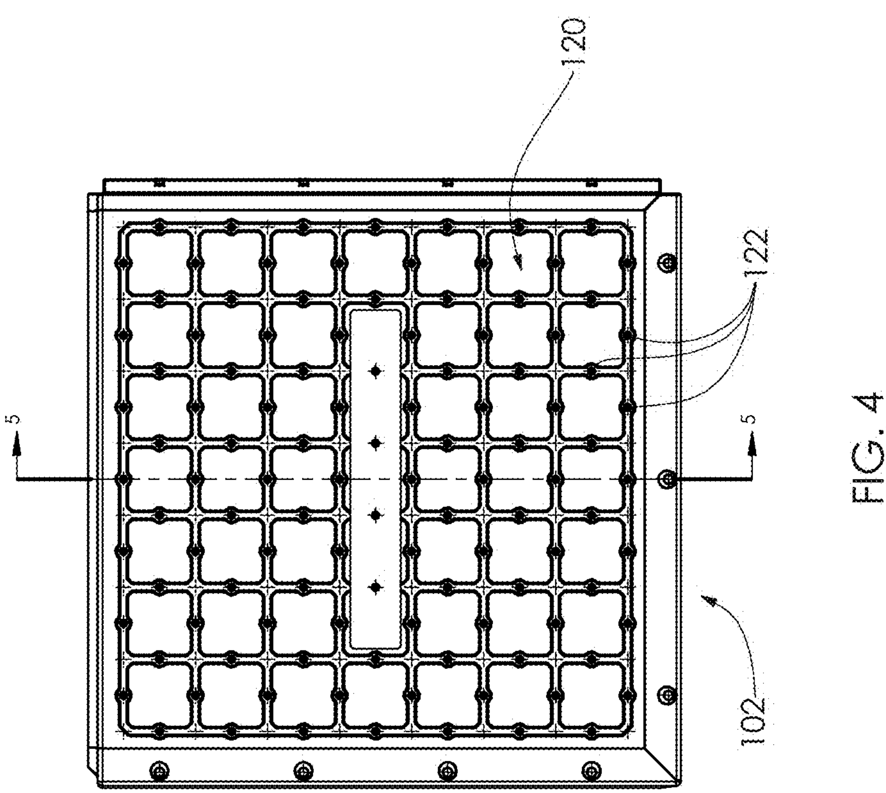
FIG. 4 is an elevational view of an outer surface of a side panel of the crate, further showing a repeating pattern of outer fastening holes therein.
Figure 7:
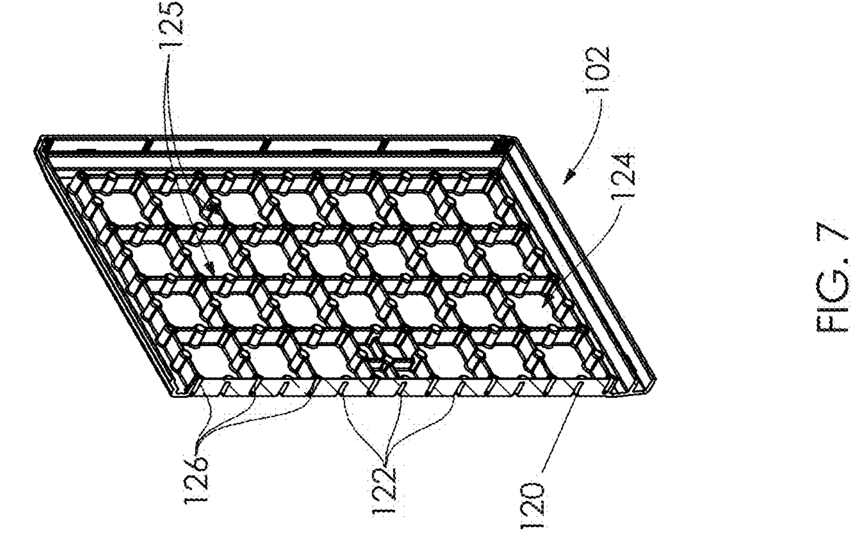
FIG. 7 is a cross-sectional perspective view of the side panel taken along the line 7-7 in FIG. 6.
Figure 6:
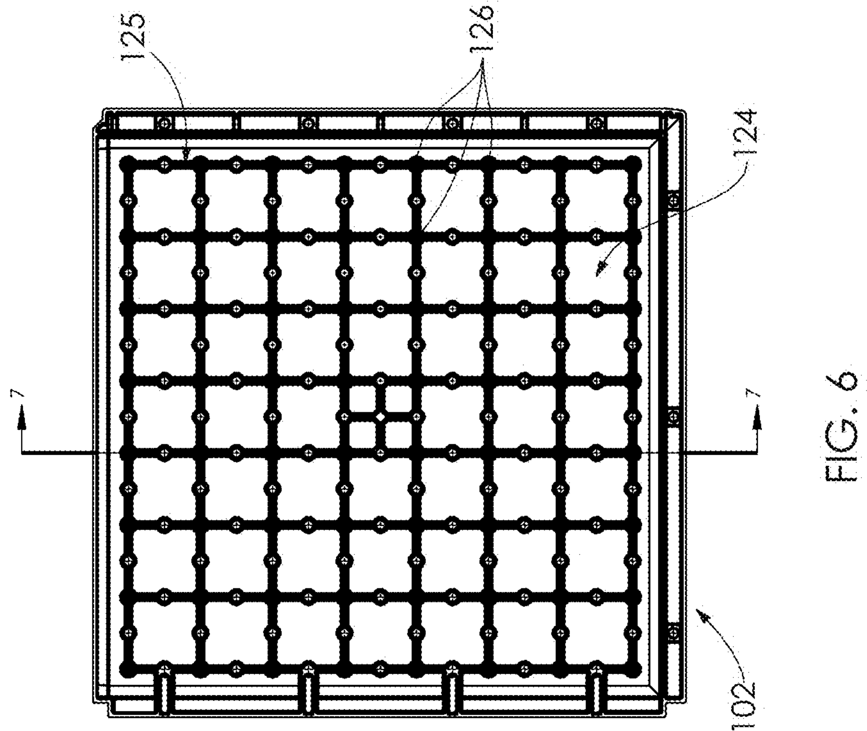
FIG. 6 is an elevational view of an inner surface of a side panel, further showing a repeating pattern of inner fastening holes therein.

As shown in FIG. 4, each side panel 102 may be provided with an outer surface 120 having outer fastening holes 122 (e.g., threaded or threadable holes). The outer fastening holes 122 extend into the side panels 102 and only partially through the side panels 102 so as not to extend through an inner surface 124 of the side panels 102, as is shown in FIG. 5. In this way, the outer fastening holes 122 do not communicate with an inside area of the crate 100 so as to prohibit fluid from flowing through the outer fastening holes 122 into the crate 100. As shown in FIG. 6, the inner surface 124 of each side panel 102 may be comprised of a ribbed or lattice structure 125. Inner fastening holes 126 (e.g., threaded or threadable holes) are supported at intersections of the lattice structure 125. Between the inner fastening holes 126, the lattice structure 125 defines or provides a barrier for the outer fastening holes 122 (the outer fastening holes 122 terminate at the barrier), as shown in FIG. 7. The inner fastening holes 126 extend into the lattice structure 125 and only partially through the lattice structure 125 so as not to extend through the outer surface 120 of the side panels 102, as is shown in FIG. 7. In this way, the inner fastening holes 126 do not communicate with an outer area of the crate 100 so as to prohibit fluid from flowing through the inner fastening holes 126 into the crate 100 from outside the crate 100. The holes 122, 126 are preferably arranged in a pattern that repeats, with the pattern of outer fastening holes 122 being superimposed in relation to the pattern of inner fastening holes 126. The partially extending holes 122, 126 form blind holes that provide points of attachment for accessories, dividers, organizers, and the like, for customization of the crate 100 without drilling holes to provide a leak-proof structure. The holes 122 are also preferably equally spaced and the holes 126 are also preferably equally spaced to promote universal attachment of accessories, dividers, organizers, and the like.

Figure 8:
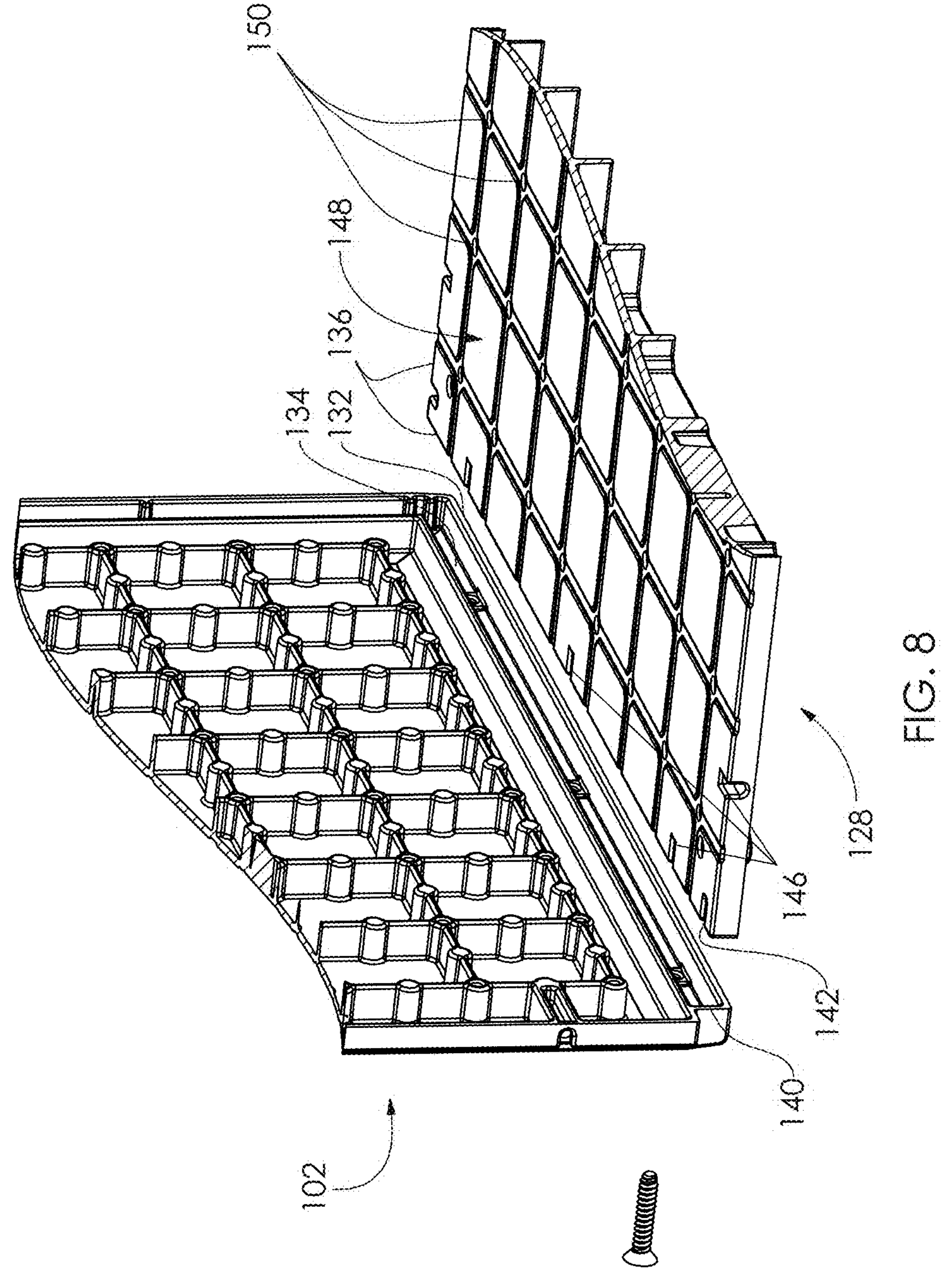
FIG. 8 is an exploded perspective view of a side panel and a bottom panel of the crate, in relevant part, further showing cooperating portions thereof.

As shown in FIG. 8, the crate 100 may be comprised of a bottom panel 128 that interfaces along the bottom corners 130 of the crate 100 (shown in FIG. 1) along adjacent bottom edges 132 of the side panels 102. The bottom edges 132 of each side panel 102 may have a female member or groove 134 that may extend the length of the bottom edges 132. A perimeter edge or side edges 136 of the bottom panel 128 may form or function as a male member or tongue, which may extend the length of the side edges 136 of the bottom panel 128. The side edges 136 of the bottom panel 128 may be inserted into the groove 134 of an adjacent one of each of the side panels 102 so that the bottom panel 128 and the side panels 102 cooperate in an interlocking fashion, for example, in a snug fit male and female connection or relationship. The four corners of the bottom panel 128 may each be provided with a tab 140 that may be oriented to align with and insert into a notch or slot 142 defining a terminal end of each groove 134 along the bottom edge 132 of each side panel 102. It should be appreciated that the assembly of the side and bottom panels 102, 128 together form an enclosure. The bottom edges 132 of the side panels 102 may be provided with one or more through holes 144 (shown in FIG. 3). The side edges 136 of the bottom panel 128 may be provided with one or more threadable structures 146 (e.g., bores, troughs, channels, or other suitable structures) that each align with a corresponding one of the through holes 144 (shown in FIG. 3). A screw 118 (shown in FIG. 3), such as a self-threading screw, may pass through or be threaded through the holes 144 and thread into a corresponding one of the threadable structures 146 to secure adjacent edges 136, 132 of side and bottom panels 102, 128 together. The holes 144 are preferable countersunk holes and the screws 118 are preferably flush-mount flat head screws having a tapered head that fits in the countersunk holes 144 so that the head of the screws 118 are flush in an outer surface of the side panels 102. It should be appreciated that the male and female connection may form a watertight (e.g., water resistant or waterproof) connection between the perimeter edge or side edges 136 of the bottom panel 128 and the bottom edges 132 of the side panels 102.

The bottom panel 128 may be provided with an upper surface 148 having inner fastening holes 150 (e.g., threaded or threadable holes). The inner fastening holes 150 extend into the bottom panel 128 and only partially through the bottom panel 128. Accordingly, the inner fastening holes 150 do not communicate with an outer area of the crate 100 so as to prohibit fluid from flowing through the inner fastening holes 150 into the crate 100, as is shown in FIG. 8. The holes 150 are preferably equally spaced to promote universal attachment of accessories, dividers, organizers, and the like.

Figure 9:
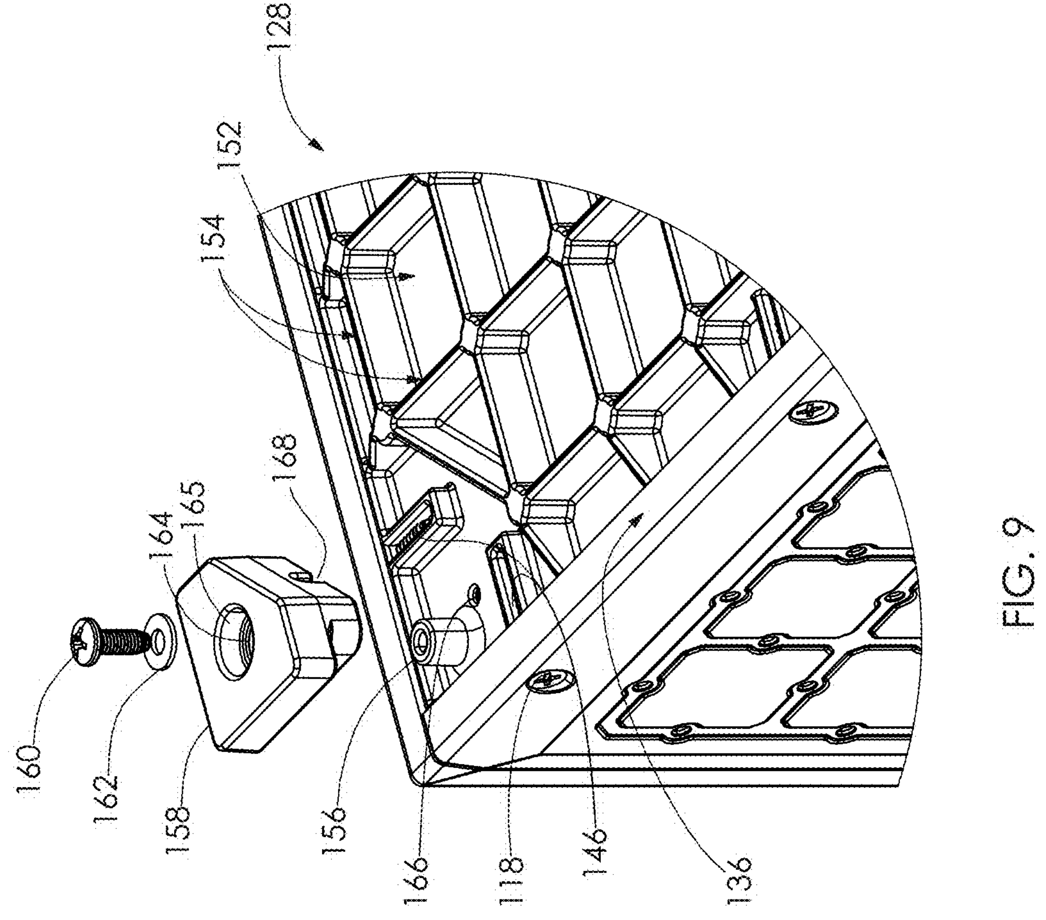
FIG. 9 is an enlarged bottom perspective view of the crate, in relevant part, with a foot exploded therefrom.
Figure 11:
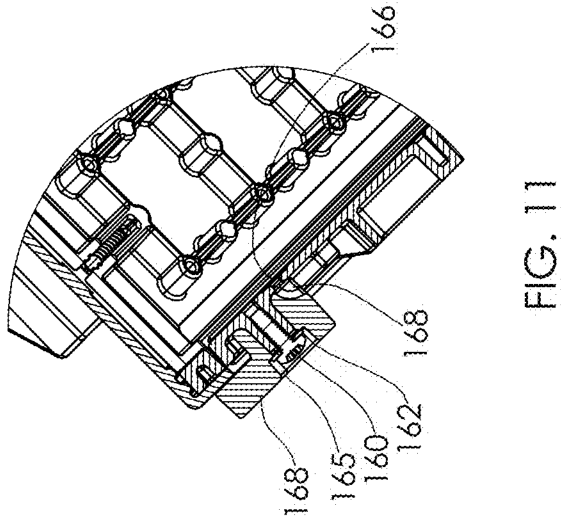
FIG. 11 is a cross-sectional view of a portion of the crate taken along the line 11-11 in FIG. 10.
Figure 10:
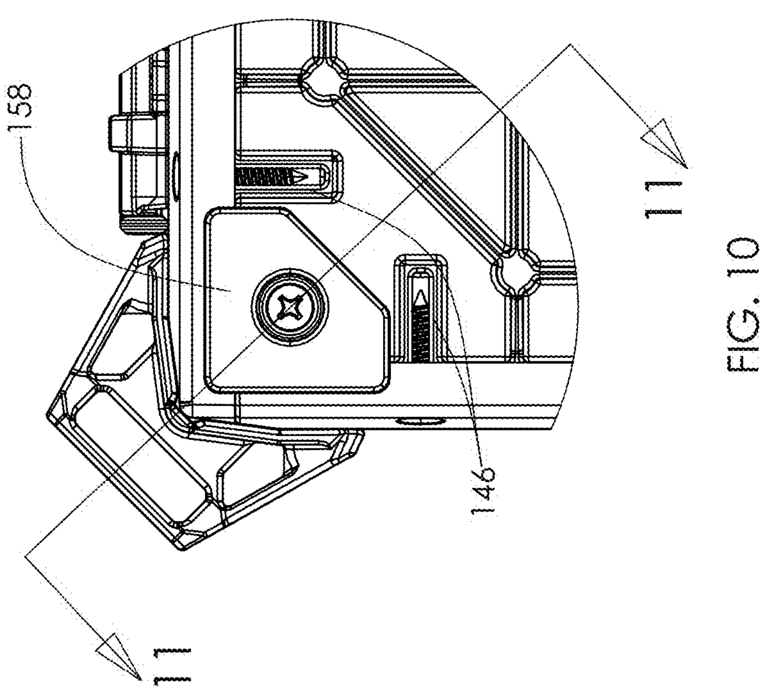
FIG. 10 is an enlarged bottom plan view of the crate, in relevant part, showing a foot attached to a corner thereof.
Figures 12, 13, 14:
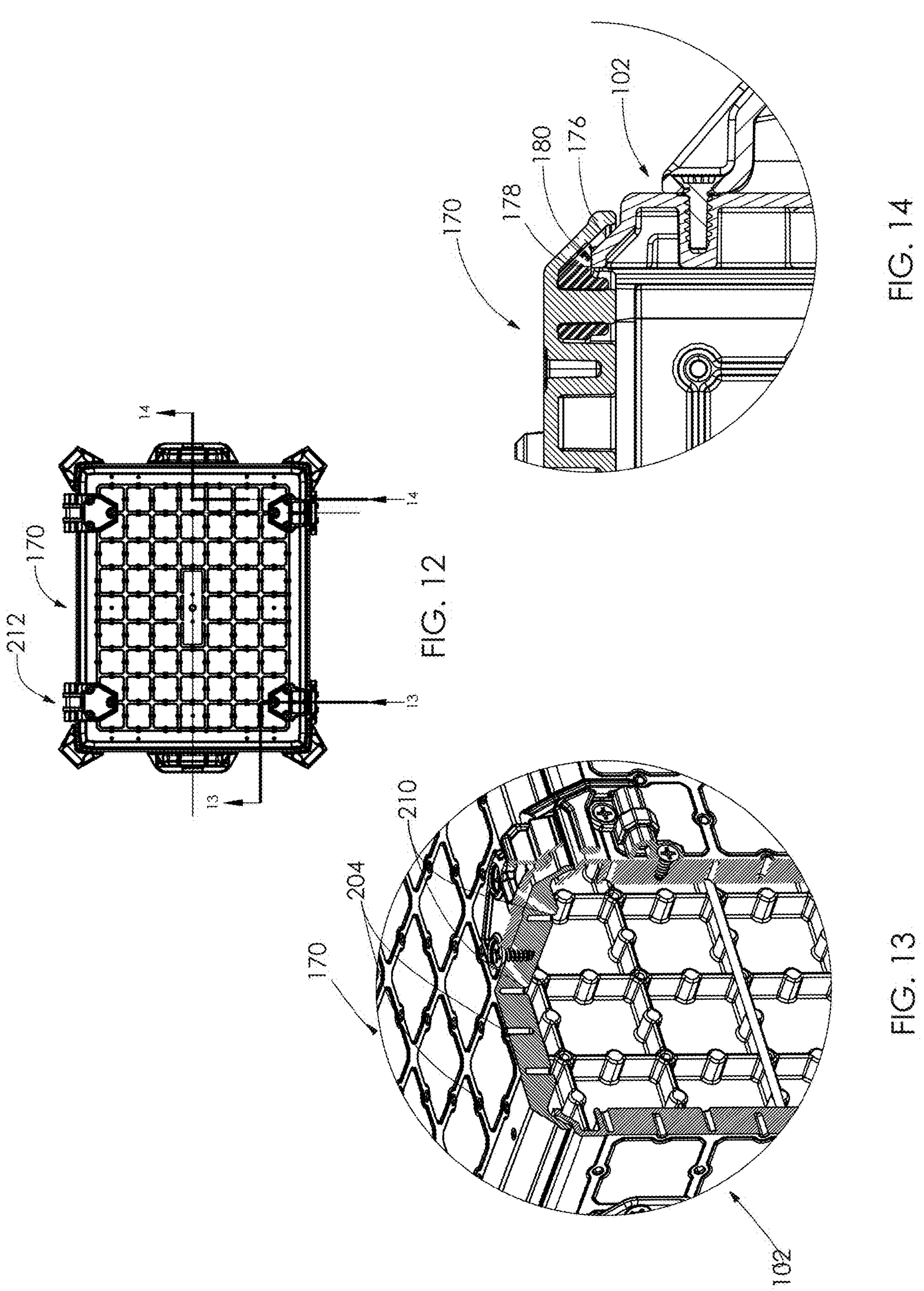
FIG. 12 is a reduced-scale top plan view of the crate, showing a top panel or lid thereof with a repeating pattern of outer fastening holes therein.
FIG. 13 is an enlarged cross-sectional view of a portion of the crate taken along the line 13-13 in FIG. 12, showing cooperating edges of the side and top panel thereof.
FIG. 14 is an enlarged cross-sectional view of a portion of the crate taken along the line 14-14 in FIG. 12, further showing the cooperating edges of the side and top panels thereof, with a bumper therebetween for mitigating physical contact between the side panel and top panel or lid to reduce the risk of noise due to closure of the lid in relation to the side panels.

As shown in FIGS. 9-11, the bottom panel 128 may be provided with a lower surface 152 comprised of a ribbed or lattice structure 154 supporting at intersections of the lattice structure 154 defining the inner fastening holes 150 (shown in FIG. 8) and comprising a barrier at the terminal ends of the fastening holes 150 to prohibit fluid flow or communication through the fastening holes 150. A threaded or threadable boss 156 (or other suitable structure) is provided preferably at the corners of the bottom panel 128 for securement of a pad or foot 158 to the bottom panel 128, or at corners of a bottom of the crate 100. The foot 158 is preferably formed from a rubber or suitable polymer with a sufficiently high frictional coefficient to prevent or reduce the risk of the crate 100 sliding. The foot 158 is secured to the corners by a screw 160, preferably a pan head blunt tip screw, and a flat washer 162. The foot 158 may be provided with a through hole 164 through which a threaded shaft of the screw 160 may pass and a recess 165 for receiving the washer 162 and the head of the screw 160. The screw 160 may be threaded into the boss 156 to secure the foot 158 to the bottom panel 128, with the washer 162 and the head of the screw 160 recessed in the recess 165. A through hole 166 may pass through the bottom panel 128 to allow passage of fluids from within the crate 100 through the through hole 166. This may permit discharge of fluids that may enter into the crate 100, such as fluids spilled into the crate 100 or otherwise entering into the crate 100. The foot 158 would preferably elevate the crate 100 above a supporting surface and provide clearance for the through hole 166 (such as by a notch 168) so that fluids may pass through the bottom panel 128 from within the crate 100 but reduce the amount of fluids entering into the bottom panel 128 from outside the crate 100 due to the elevation of the crate 100 by the foot 158.

The crate 100 may be comprised of a top panel or lid 170, as shown in FIGS. 12-15, that may be hingedly attached to the crate 100, particularly, to an upper portion or region of at least one of the side panels 102 of the crate. The lid 170 is preferably a water [ ]-chamfered lid, which has an inner sloped or angled surface 172 with a ridge 174 about a perimeter edge or side edges 175 of the lid 170 (shown in FIG. 15) that matingly engages or cooperatively interfaces with a complementary inner sloped or angled surface 176 with a ridge 178 along a top edge 180 (shown in FIG. 14) of the side panels 102, the top edges 180 of the side panels 102 cooperatively forming a perimeter edge that defines an opening 182 (shown in FIG. 3) to the crate 100, the opening 182 being bounded by the perimeter edge cooperatively formed by the top edge 180 of the side panels 102. The lid 170 may further be comprised of an angled outer perimeter surface 184 (shown in FIG. 1) that may function as a drip rail to direct fluids downward toward the side panels 102 and away from the opening 182 of the crate 100. This arrangement (e.g., the chamfered lid 170 and drip rail 184) reduces the risk that rainwater or other fluids may enter into the opening 182 of the crate 100 when the lid 170 is in a closed position. The lid 170 may have a stop or interface 186 (shown in FIG. 15) that cooperates with the ridge 178 (shown in FIG. 14) along an uppermost edge of the side panels 102. The interface 186 is preferably in the form of a notch that extends about or proximate [ ] to the perimeter edge or side edges 175 of the lid 170. The notch may form or define an inner and outer surface, and ridge 178 along a top edge 180 of the side panels 102 may be bounded by the inner and outer surface to reduce the risk of the side panels 102 collapsing to maintain the structural integrity of the side panels 102 and thus the crate 100.

Figure 15:
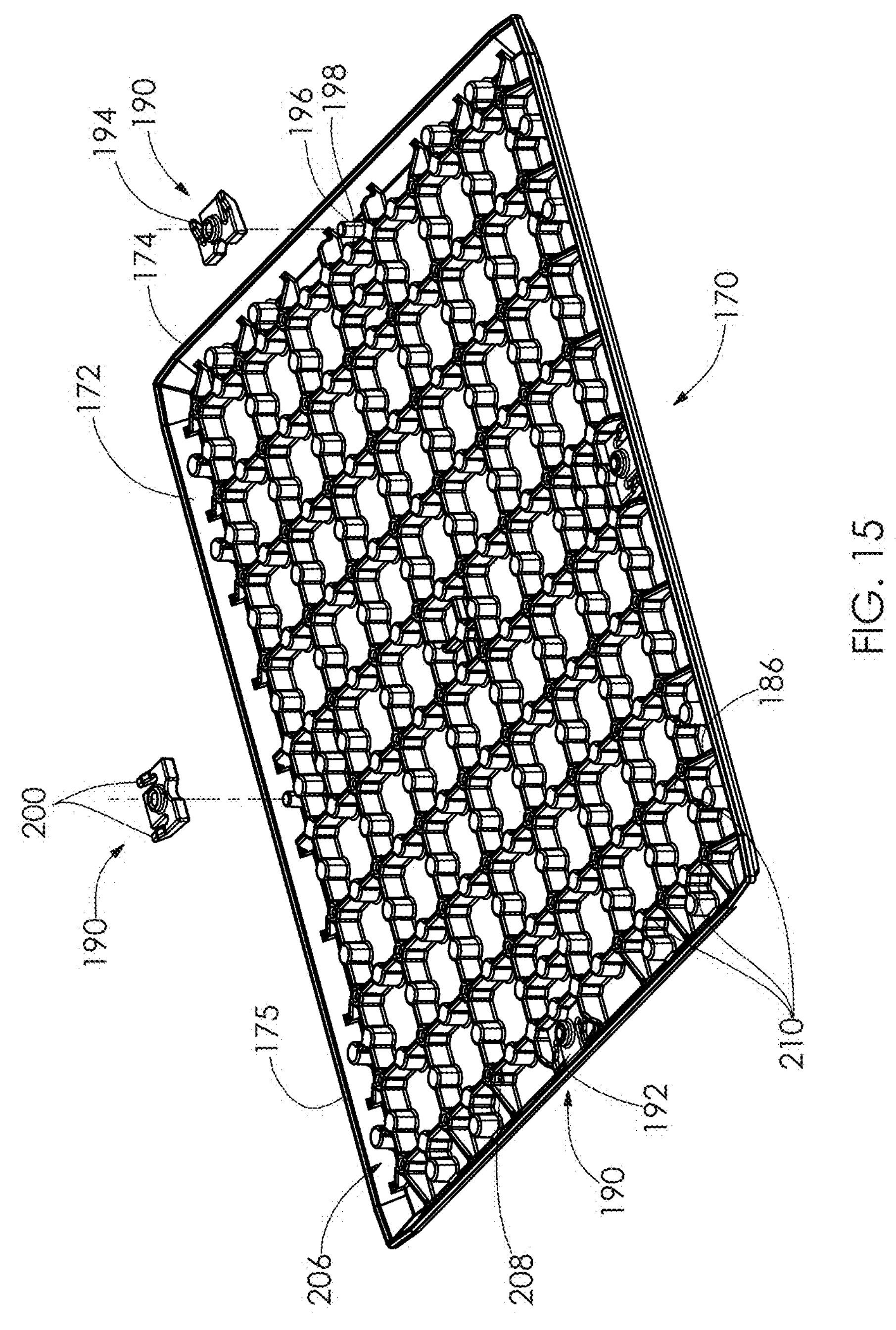
FIG. 15 is an enlarged partially exploded bottom perspective view of the top panel or lid of the crate, showing bumpers exploded therefrom, and showing a repeating pattern of inner fastening holes therein.

As shown in FIG. 15, the lid 170 may be provided with bumpers 190, which may be attached at suitable locations about the perimeter edge or side edges 175 of the lid 170. The bumpers 190 quiet the lid 170 or otherwise suppress noise due to vibration of the lid 170 in relation to the side panels 102, as noise due to vibration may alert fish of the presence of a user, and thus frighten the fish away. The bumper 190 may be made of any suitable material but is preferably in the form of a thermomel, which is a polymer with a mineral or talc or clay fill, which has sound-deadening properties. The bumper 190 may take any suitable shape. The illustrated bumper 190 comprises a main body portion 192 having a through hole 194 centrally located and the lid 170 has a boss or pin 196, which may be located at various points along, proximate to, or adjacent to the perimeter edge or side edges 175 of the lid 170 (e.g., four points shown in the drawings, one along each side edge 175 of the lid 170). The pin 196 is dimensioned and configured to be received by the through hole 194 of the bumper 190, preferably in a snug or tight-fit relationship. An inner surface of the bumper 190 has a cutout or relief, which may be semi-circular or semi-cylindrical, to cooperate with a semi-circular or semi-cylindrical structure 198 spaced from the pin 196, which cooperatively function to maintain the position of the bumper 190, to prevent or reduce the risk of the bumper 190 rotating in relation to the pin 196. An outer upper surface of the bumper 190 has a chamfered or angled surface that mates with or provides clearance for the inner chamfered surface (i.e., the inner sloped or angled surface 172) of the lid 170. Moreover, the bumper 190 may be comprised of laterally spaced fingers 200, which are cantilevered in relation to the body of the bumper 190, and which are resilient or flexible. The fingers 200 extend outwardly and downwardly in relation to the lid 170, or in relation to the perimeter edge or side edges 175 of the lid 170, when supported in relation to the lid 170. The fingers 200 come into contact with the ridge 178 along the top edge 180 of the side panels 102 when the lid 170 is closed and bias against the ridge 178 to maintain a space between the lid 170 and the side panels 102 so as to reduce the risk of vibration and thus sound caused by vibration between the lid 170 and the side panels 102.

Figure 16:
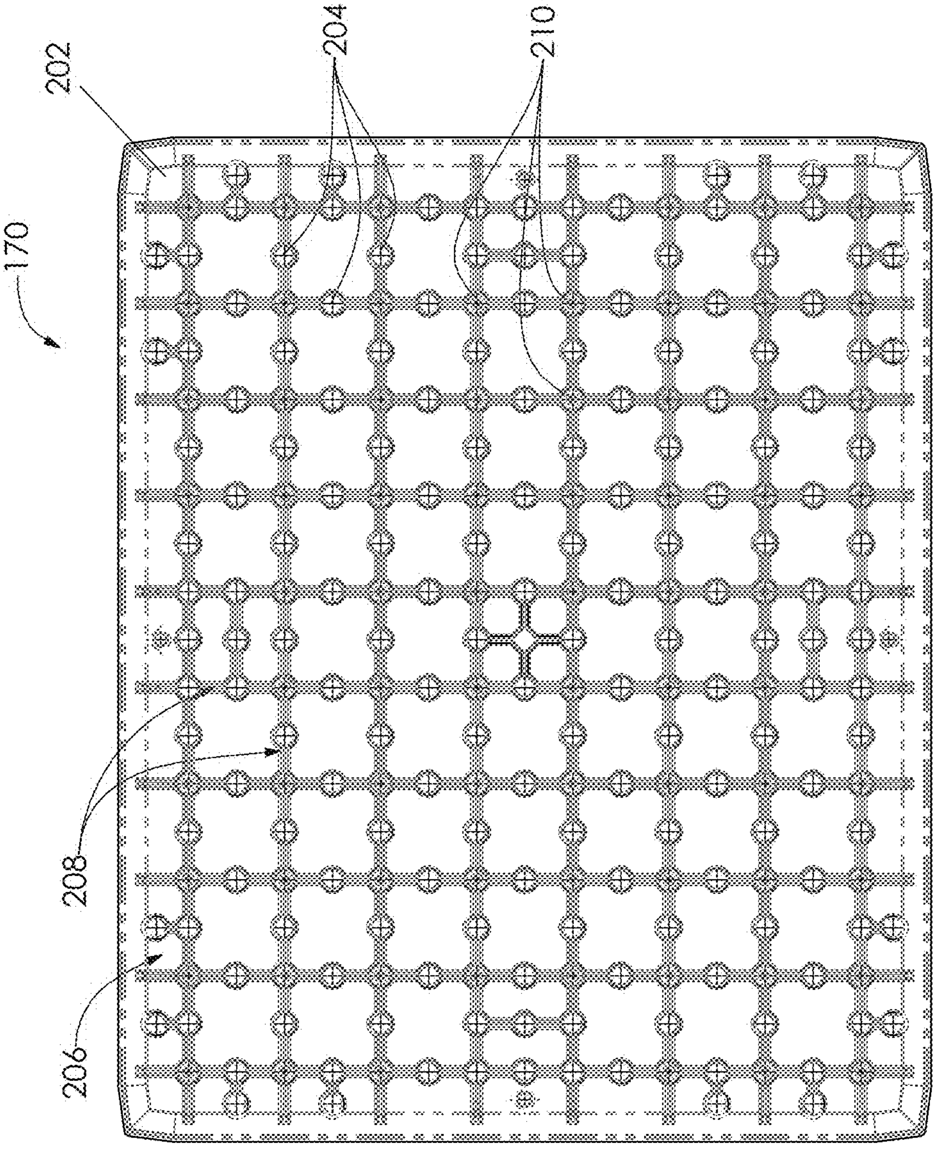
FIG. 16 is an enlarged bottom plan view of the top panel or lid, further showing a repeating pattern of inner fastening holes therein.

As shown in FIG. 16, the lid 170 may be provided with an outer surface 202 having outer fastening holes 204 (e.g., threaded or threadable holes). The outer fastening holes 204 extend into the lid 170 and only partially through the lid 170. In this way, the outer fastening holes 204 do not communicate with an inside area of the crate 100, as is apparent from viewing FIG. 15, so as to prohibit fluid from flowing through the outer fastening holes 204 into the crate 100. As shown in FIG. 15, the lid 170 may be provided with an inner surface 206, which may be comprised of a lattice structure 208 supporting at intersections of the lattice structure 208 and inner fastening holes 210 (e.g., threaded or threadable holes) and structure between the inner fastening holes 210 defining the outer fastening holes 204 (shown in FIG. 16), with a barrier into which the outer fastening holes 204 terminate. The inner fastening holes 210 preferably extend into the lattice structure 208 and only partially through the lattice structure 208 so as not to extend through the lid 170. In this way, the inner fastening holes 210 do not communicate with the outer area of the crate 100 so as to prohibit fluid from flowing through the inner fastening holes 210 into the crate 100 from outside the crate 100. The holes 204, 210 are preferably arranged in a pattern that repeats, with the pattern of outer fastening holes 204 preferably being superimposed in relation to the pattern of inner fastening holes 210. The partially extending holes 204, 210 form blind holes that provide points of attachment for accessories, dividers, organizers, and the like, for customization of the crate 100 without drilling holes to provide a leak-proof structure. The outer fastening holes 204 are also preferably equally spaced and the inner fastening holes 210 are also preferably equally spaced to promote universal attachment of accessories, dividers, organizers, and the like.

Figures 17, 18:
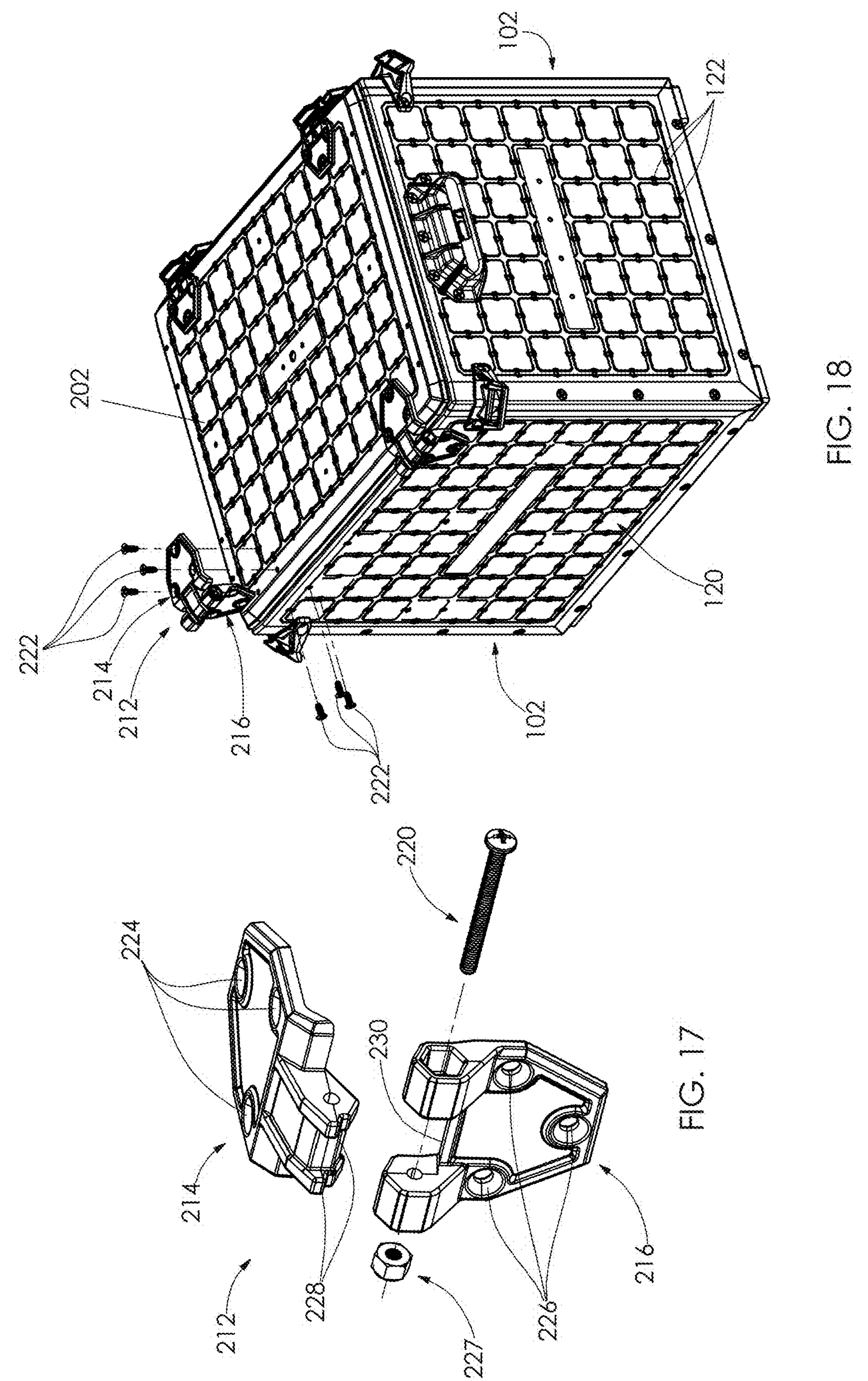
FIG. 17 is an enlarged exploded perspective view of a hinge supporting the top panel or lid in relation to a side panel of the crate.
FIG. 18 is a perspective view of the crate with the top panel or lid partially attached thereto by a hinge, and another hinge exploded therefrom.
Figure 19:
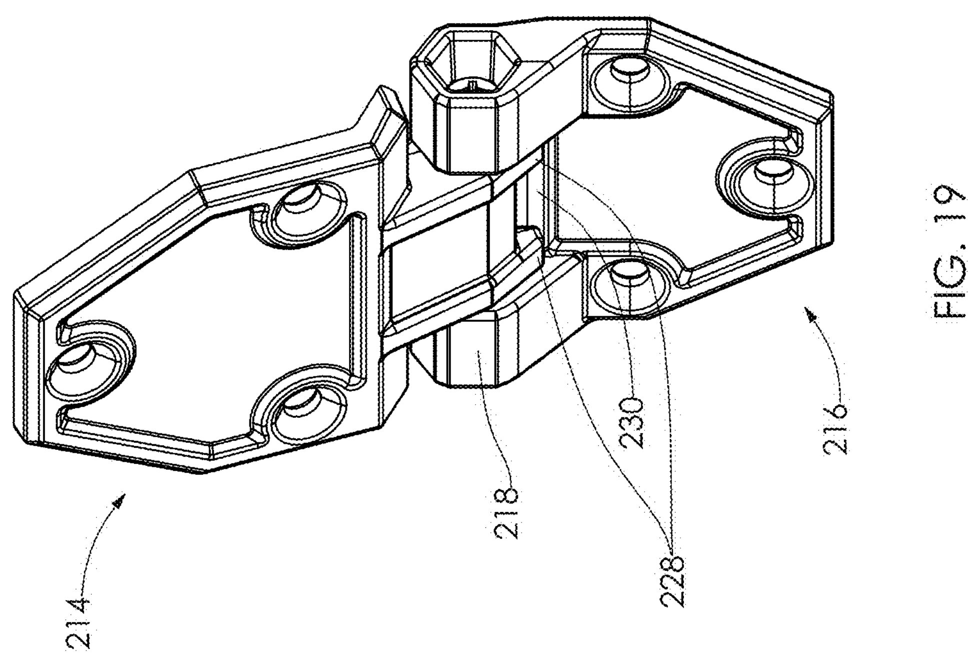
FIG. 19 is a perspective view of the hinge showing a stop feature thereof for limiting travel of one hinge portion in relation to another, thus limiting travel of the top panel or lid in relation to a corresponding side panel to which the top panel or lid is attached.

The lid 170 may be attached to a corresponding side panel 102 in any suitable manner. In the illustrated crate 100, shown in FIG. 18, the lid 170 is attached for pivot movement in relation to a side panel 102 by hinges 212 or other suitable joints or structure. As shown in FIG. 17, the hinges 212 may be comprised of leaves 214, 216 joined together at a knuckle 218 (referenced in FIG. 19) by a pin 220. The leaves 214, 216 may be fastened at desired locations on the lid 170 and a desired one of the side panels 102 by fasteners 222 (e.g., flat head blunt tip screws) (shown in FIG. 18) having a threaded shaft that passes through through holes 224, 226 in the leaves 214, 216 and is threaded into holes, which may include desired holes 122, 204 in the outer surface 120 of the side panel 102 (shown in FIG. 18) and the outer surface 202 of the lid 170 (shown in FIG. 18). The holes 224, 226 in the leaves 214, 216 may be countersunk and the fasteners 222 may have tapered heads that fit in a recessed fashion in the countersunk holes 224, 226 so as to be flush with or recessed in the leaves 214, 216. The pin 220 is preferably adjustable so that the pin 220 may be tightened to increase tension on the knuckle 218 or loosened to decrease tension on the knuckle 218. This may be done in any suitable manner. However, the illustrated pin 220 comprises a threaded fastener onto which a nut 227 may be tightened and loosened to achieve a desired tension. The pin 220 preferably has a head that may be recessed in relation to a first knuckle portion of the leaf 214 and the nut 227 may be recessed in relation to a second knuckle portion of the leaf 214. The nut 227 may be recessed in relation to a hexagonal recess or hole in the knuckle portion to prevent the nut 227 from rotating as the pin 220 is threaded into the nut 227. The hinge 212 may further comprise a stop which may limit pivotal movement of the leaves 214, 216 in relation to one another and thus, limit pivotal movement of the hinge 212. The stop may have any suitable configuration. However, the illustrated stop, as shown in FIG. 19, comprises tabs 228 supported in relation to one leaf 214 that may be engageable with a ridge 230 supported in relation to the other leaf 216 when the lid 170 is opened to limit travel of the lid 170 in relation to the side panel 102 when the lid 170 is opened.

Figure 21:
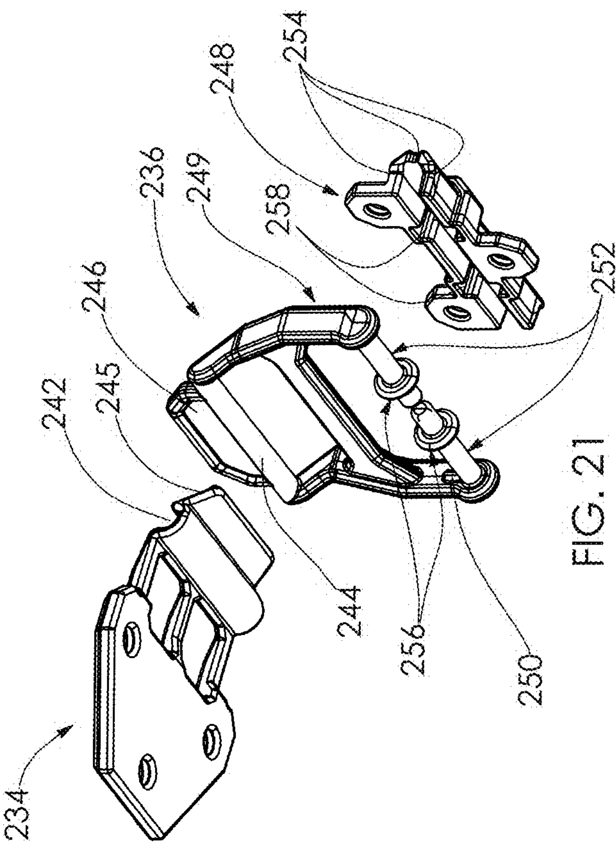
FIG. 21 is an exploded perspective view of the latch assembly.
Figure 20:
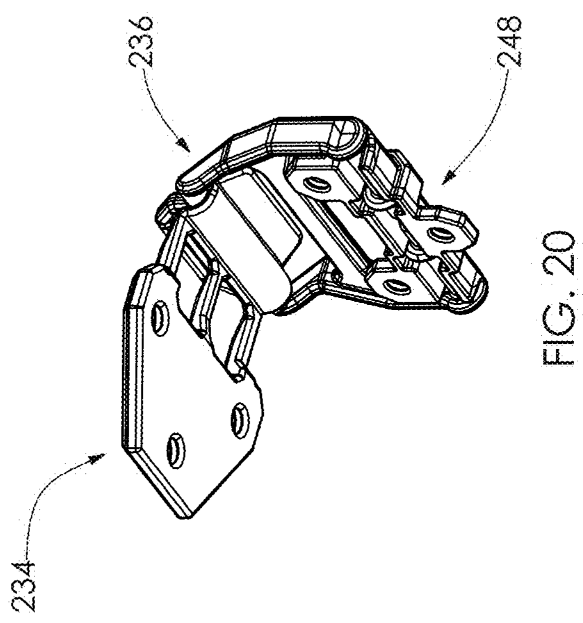
FIG. 20 is a bottom inner perspective view of a latch assembly for latching the top panel or lid in relation to a corresponding side panel.
Figure 22:
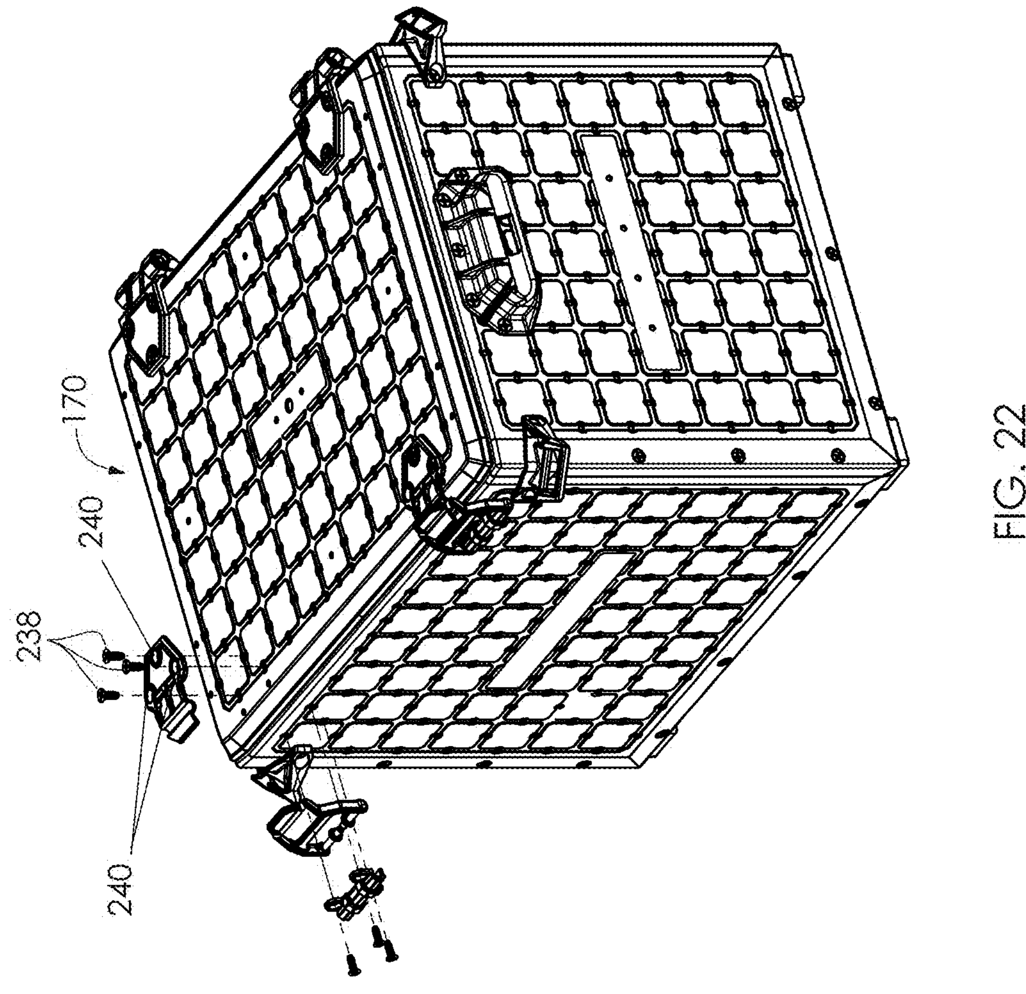
FIG. 22 is a perspective view of the crate with the top panel or lid held in a closed position by a latch assembly, and another latch assembly exploded therefrom.
Figures 23, 24, 25:
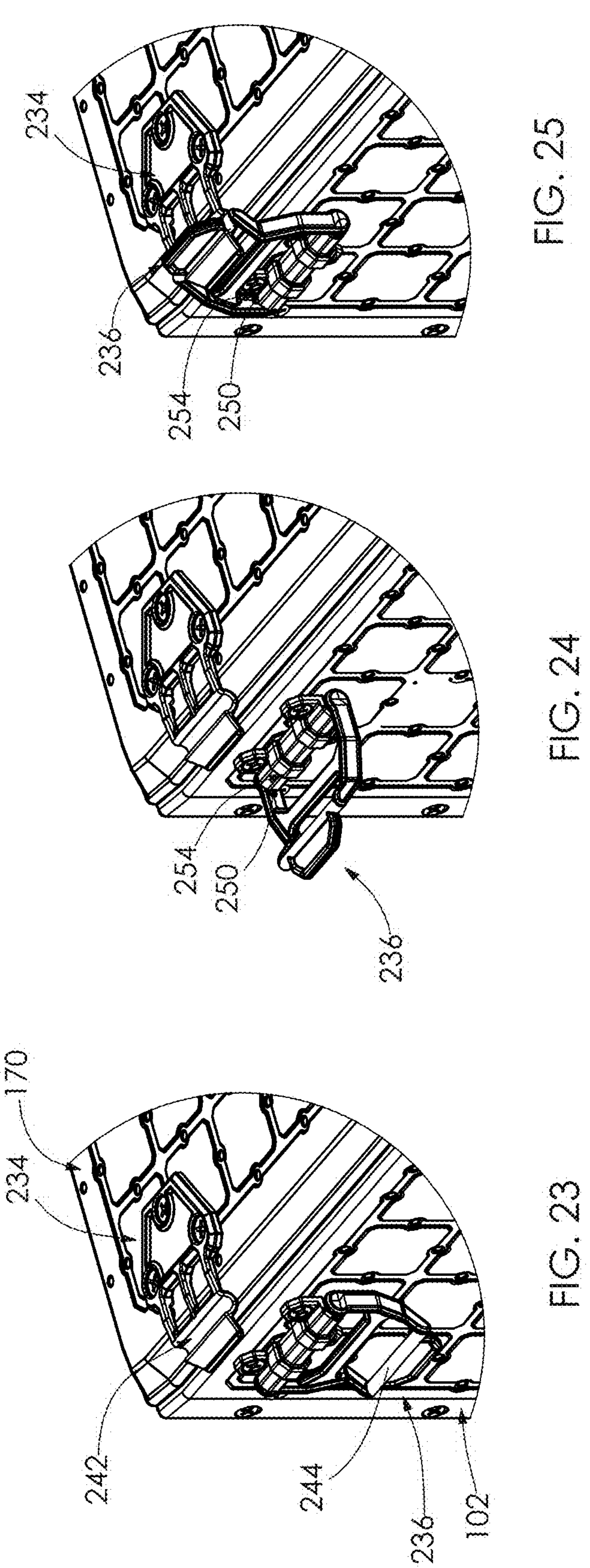
FIG. 23 is a perspective view of the crate, shown in relevant part, with a latch assembly shown in a fully unlatched position, with a portion thereof extending downward adjacent to a corresponding side panel.
FIG. 24 is a perspective view of the crate, shown in relevant part, with a latch assembly shown in an unlatched position, with a portion thereof extending away from a corresponding side panel.
FIG. 25 is a perspective view of the crate, shown in relevant part, with a latch assembly shown in a fully latched position.

The lid 170 may be held in a closed position by one or more latch assemblies 232 (shown in FIG. 1), which may be comprised of a catch 234, which cooperates with a latch 236, shown in FIGS. 20 and 21. It should be understood that the catch 234 may mount or fasten to the crate 100 at desired locations to the lid 170 and the latch 236 may mount or fasten to a desired one of the side panels 102 opposite the hinges 212, as is shown in FIG. 22. The catch 234 is configured to be mounted or fastened in relation to the lid 170 so as to have a portion cantilevered from a side edge 175 of the lid 170 (shown in FIGS. 23-25) opposite the hinges 212 (shown in FIG. 22). The catch 234 may be attached to the lid 170 using, for example, fasteners 238, such as flat head blunt tip screws, as shown in FIG. 22. The fasteners 238 may be threaded into desired holes 204 in the outer surface 202 of the lid 170. The fasteners 238 may include a threaded shaft that may pass through holes 240 (shown in FIG. 22) in the catch 234 and a head that is recessed within a countersunk portion of the holes 240 so as to be flush or recessed. The cantilevered portion of the catch 234 may be comprised of an upwardly exposed laterally extending groove 242, which is configured to cooperate with a laterally extending bar 244 of the latch 236 when in a latched position or condition (shown in FIGS. 23-25). A tab 245 (shown in FIG. 21) may extend from the laterally extending bar 244 and function as a control for controlling pivotal movement of the latch 236. As shown in FIG. 21, tab 246 may also extend outwardly from the laterally extending groove 242, which when depressed, releases the bar 244 from the groove

242 to release or unlatch the latch assembly 232 (referenced in FIG. 1), which in turn permits the lid 170 to be opened or moved to the open position. The tab 246 may also be depressed to mitigate, suppress or minimize noise that may otherwise be produced by a snap fit engagement of the bar 244 into the groove 242, which may alert fish to the presence of a user, and thus frighten the fish away. As shown in FIG. 21, the latch 236 includes a mounting bracket 248 that is configured to mount to the side panel 102 adjacent or proximate the catch 234 and a latch member 249 that pivots in relation to the bracket 248. The latch member 249 supports or carries a laterally extending bar 252 and is configured to pivot about the bar 252 to three detent positions. These include a first or latched position, in which the latch member 249 extends upwardly in relation to the mounting bracket 248 and the laterally extending bar 244 engages the laterally extending groove 242 to hold the latch member 249 in a latched position (shown in FIG. 25). A second detent position is a second or medial unlatched position, in which the latch member 249 is in an unlatched position and extends perpendicularly or transversely away from the side panel 102 (shown in FIG. 24). A third detent position is a third or downward unlatched position, in which the latch member 249 is unlatched and extends downwardly (shown in FIG. 23) or substantially parallel in relation to the side panel 102. The detent positions are mechanically achieved by tabs 250 that extend radially from bar 252 that engage detents or notches 254 at three points in lateral ends of the mounting bracket 248 spaced about 90 degrees apart, shown in FIG. 21. The bar 252 may carry or support one or more radially extending surfaces 256 (two laterally spaced surfaces are shown) that may function as cam surfaces that may be captured by cathedral shaped (U-shaped) recesses 258 within the back or blind side of the mounting bracket 248. The radially extending surfaces 256 cam against the outer surface 120 of the side panel 102 to urge the latch member 249 into the three detent positions.

Figure 26:
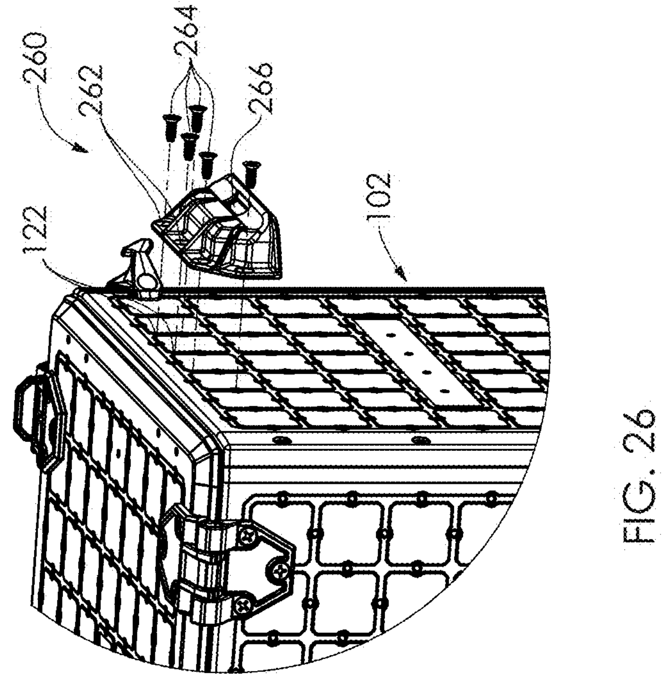
FIG. 26 is a partial perspective view of the crate with a handle thereof exploded therefrom, and with fasteners for mounting the handle exploded therefrom.

As shown in FIG. 26, handles 260 may be attached to the outer surface 120 of the side panels 102 of the crate 100 to aid in lifting and transporting the crate 100. The handles 260 may be of any suitable form and may be attached in any suitable manner. The illustrated handle 260 is in the form of a cup pull handle. The handle 260 may be provided with various through holes 262, which may be tapered through holes to form a counterbore, and which may align with corresponding outer fastening holes 122 in the outer surface 120 of the side panels 102 of the crate 100 for mounting the handles 260 in desired locations (e.g., on opposing side panels 102 of the crate 100). The handles 260 may be attached using fasteners 264, such as flat head blunt tip screws, which preferably seat flush in the through holes 262. The handles 260 may be provided with an opening, passage or slot 266 or the like to interface with a tether or bungee, or a hook or carabiner thereof (not shown), for securing the crate 100 to an environmental surface, such as, for example, a marine vessel (e.g., a kayak).

Figure 27:
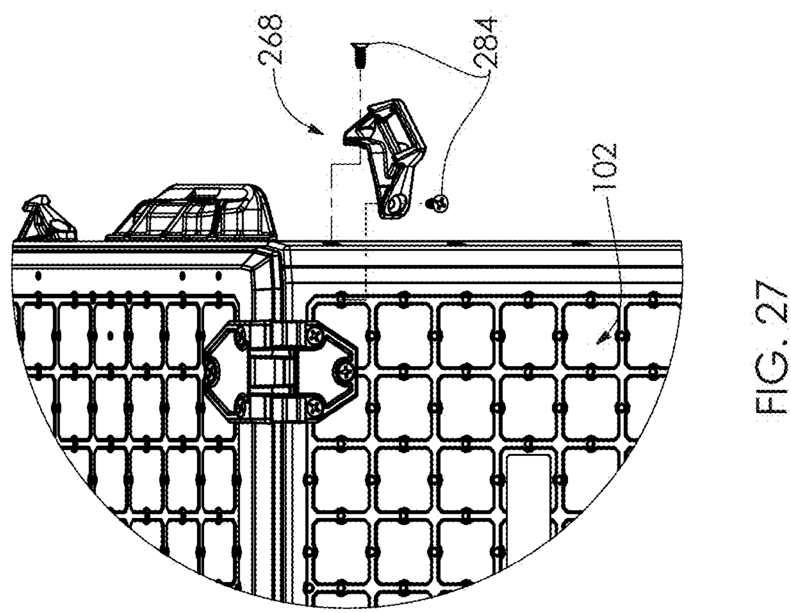
FIG. 27 is a partial perspective view of the crate, with a corner bracket exploded therefrom.
Figure 28:
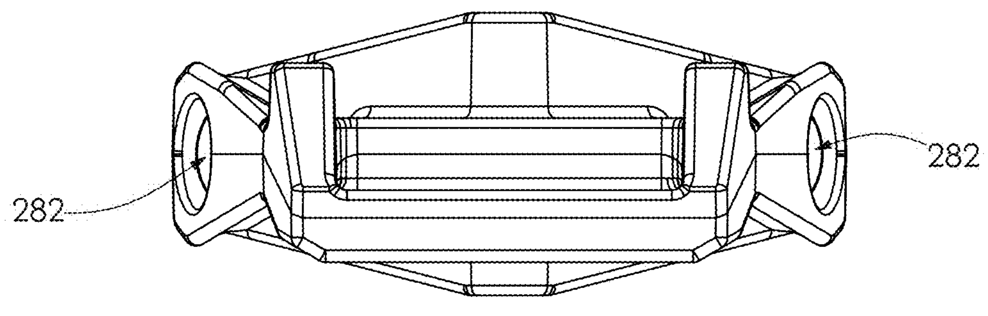
FIG. 28 is an enlarged front elevational view of the corner bracket shown in FIG. 27.
Figure 29:
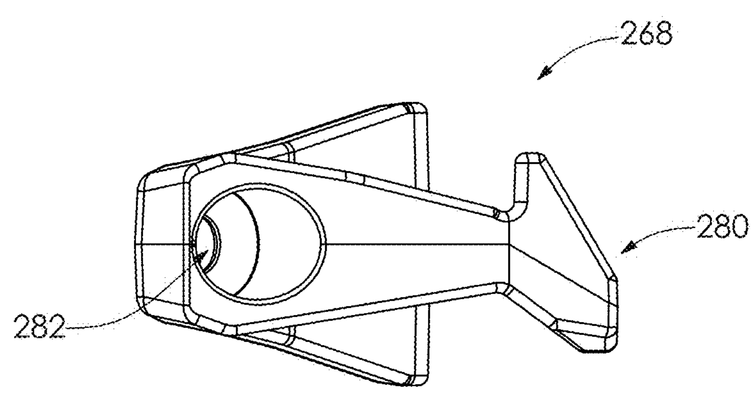
FIG. 29 is a side elevational view of the corner bracket shown in FIG. 27.
Figure 30:
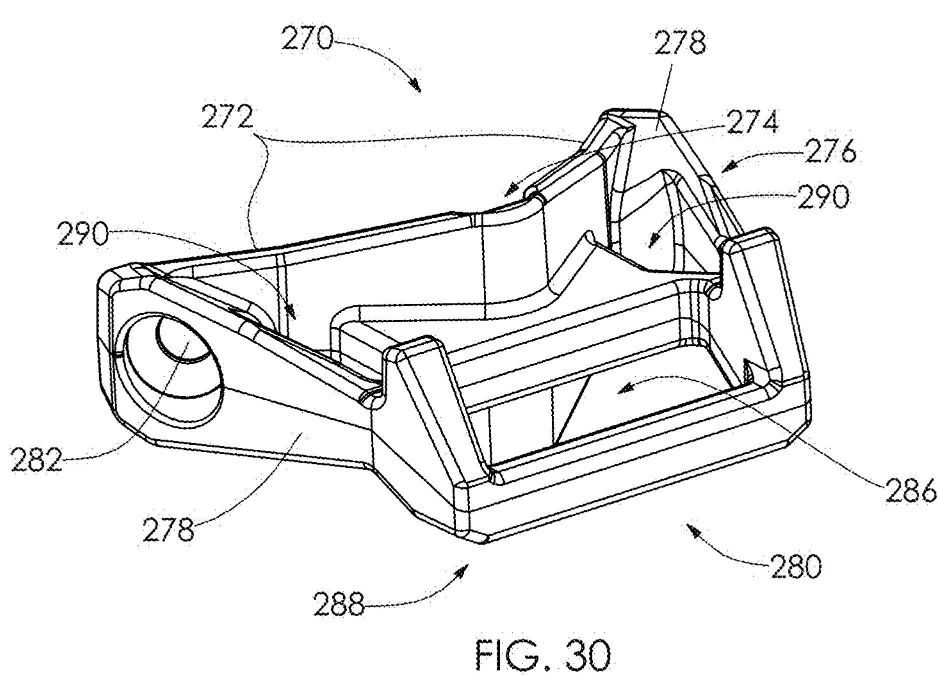
FIG. 30 is a front perspective view of the corner bracket shown in FIG. 27.
Figure 31:
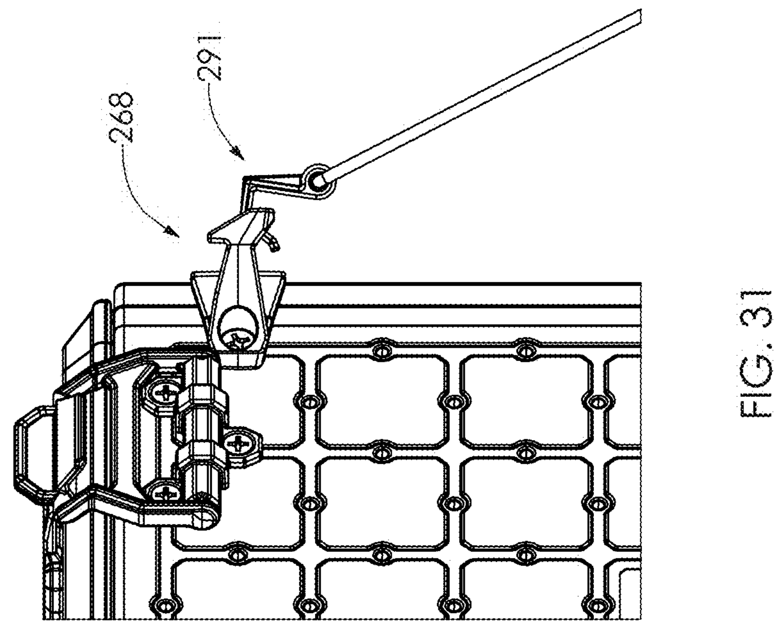
FIG. 31 is an enlarged perspective view of a portion of the crate with the corner bracket attached thereto and a hook or carabiner of a tether or bungee interfacing the corner bracket.

As shown in FIG. 27, corner brackets 268 may be attached to side corners 104 of the crate 100 adjacent side edges 106, 108 of adjacent side panels 102 of the crate 100. As shown with reference to FIGS. 28-30, the corner brackets 268 may be provided with an inner mounting structure 270, which is a V-shaped structure, which may be formed of two adjacent walls 272 supported at a right angle in relation to one another [ ] to comport with the shape of the side corners 104 of the crate 100. A clearance slot 274 may be provided at the intersection of the adjacent walls 272 to provide clearance for an outermost edge of the side corner 104. An outer lattice structure 276 extends transversely from the inner mounting structure 270. The outer lattice structure 276 may be comprised of outer walls 278 that terminate in a distal structure 280. A countersunk through hole 282 may be provided at a point of intersection of the inner mounting structure 270 and the outer walls 278, perpendicular to the adjacent walls 272 of the inner mounting structure 270 and at an angle relative to the outer walls 278 of the outer lattice structure 276. The countersunk through holes 282 are spaced to align with desired outer fastening holes 122 in the outer surface 120 along adjacent side edges 106 of adjacent side panels 102 of the crate 100. Fasteners 284 (shown in FIG. 27) may pass through the countersunk through holes 282 and thread into desired outer fastening holes 122 to attach the corner brackets 268 to the side corners 104. The outer lattice structure 276 defines an outer opening, passage or slot 286 at a cantilevered end 288 of the outer lattice structure 276 and two laterally spaced intermediate openings or passages 290 between or intermediate the inner mounting structure 270 and the outer opening, passage or slot 286. The outer opening or slot 286 and the intermediate openings or passages 290 are provided for interfacing with a tether or bungee, or a hook or carabiner 291 (shown in FIG. 31) thereof, for securing the crate 100 to an environmental surface, such as, for example, a marine vessel (e.g., a kayak).

Figure 32:
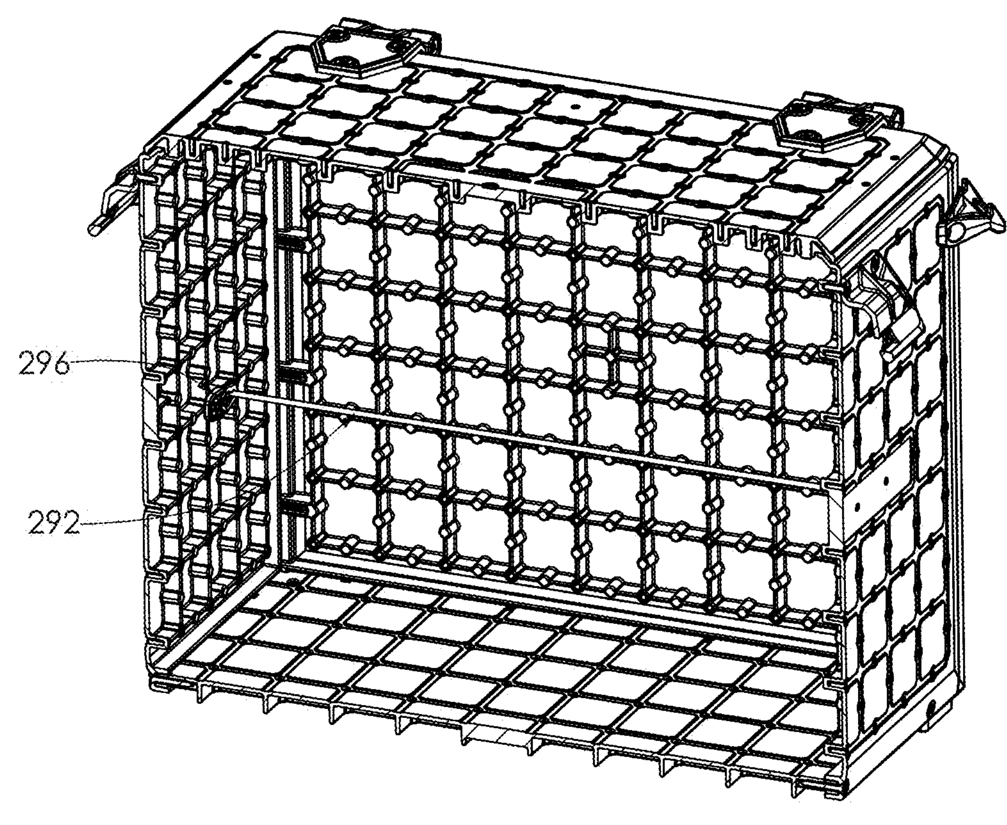
FIG. 32 is a perspective view of the interior of the crate, shown in relevant part, with a bungee supported therein, wherein the bungee may function as a divider and/or retainer for dividing the interior of the crate or retaining items within the crate.
Figure 33:
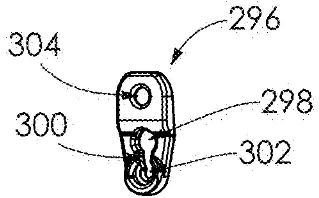
FIG. 33 is an enlarged view of an attachment structure, which may be attached to the opposing ends of a bungee for attaching the ends of the bungee to the interior of the crate.
Figure 34:
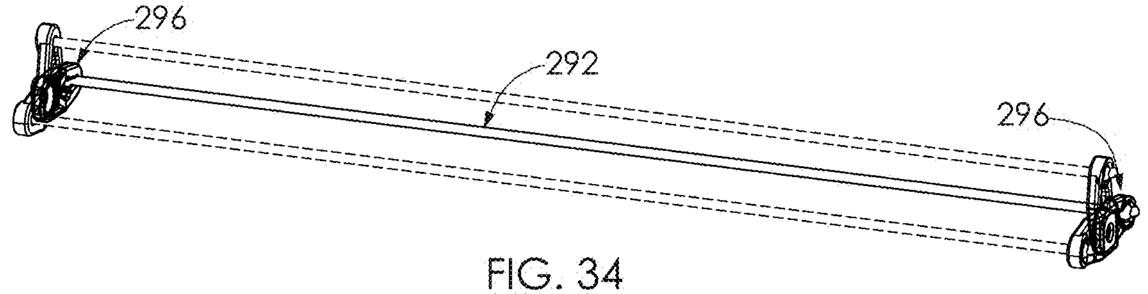
FIG. 34 is a side perspective view of the bungee, with the attachment structure supported in various positions.

The interior of the crate 100 may be divided by dividers, such as by bungees 292, as shown in FIGS. 32-34, or other suitable structure, which may be attached at desired locations, such as, to the inner fastening holes 126 supported by the inner surface 124 of opposing side panels 102 (shown in FIG. 32) of the crate 100. The bungees 292 may be provided with knots or other suitable structure (not shown) at opposing ends of the bungees 292. An attachment structure 296, as shown in FIG. 33, may be attached to the opposing ends of the bungee 292, for example, by inserting the knot into a large opening 298 of a keyhole slot 300 and then sliding the bungee 292 into a slot 302 of the keyhole slot 300 to trap the bungee 292 via the knot, which cannot pass through the slot 302. The attachment structure 296, opposite the keyhole slot 300, may be provided with a tapered through hole 304 for the passage of a fastener (not shown) therethrough, which may be threaded into a desired inner fastening hole 126 to attach the opposing ends of the bungee 292 to the inner surface 124 of opposing side panels 102. The bungees 292 may function as dividers and/or retainers for dividing the interior of the crate 100 or retaining items within the crate 100. In addition to being attachable at any one of the inner fastening holes 126, the attachment structure 296 may be infinitely adjustable by rotating the attachment structure 296 360 degrees (e.g., three positions are shown in FIG. 34) in relation to the fastener, and in any one of the inner fastening holes 126. The bungees 292 may be quickly removed by removing the ends of the bungees 292 from the keyhole slots 300 or removed altogether by removing the attachment structure 296 from within the crate 100.

Figures 35, 36, 37:
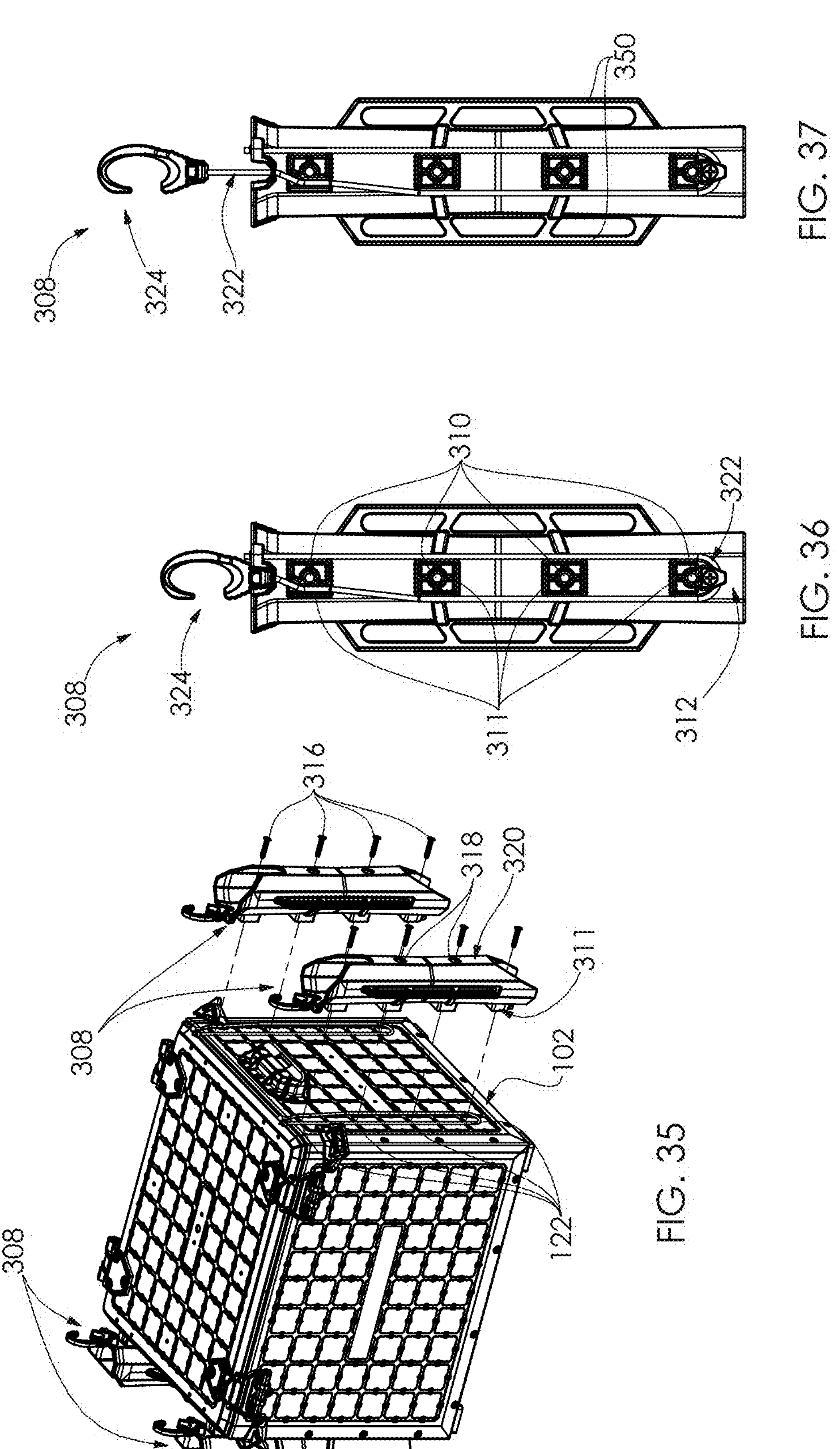
FIG. 35 is a front perspective view of the crate with rod holders mounted to one side panel thereof, and rod holders exploded from another side panel thereof.
FIG. 36 is an enlarged rear elevational view of an exemplary rod holder, with a rod hook thereof seated therein, and a bungee routed thereon.
FIG. 37 is a rear elevational view of the rod holder shown in FIG. 36, with the rod hook extending therefrom.
Figure 39:
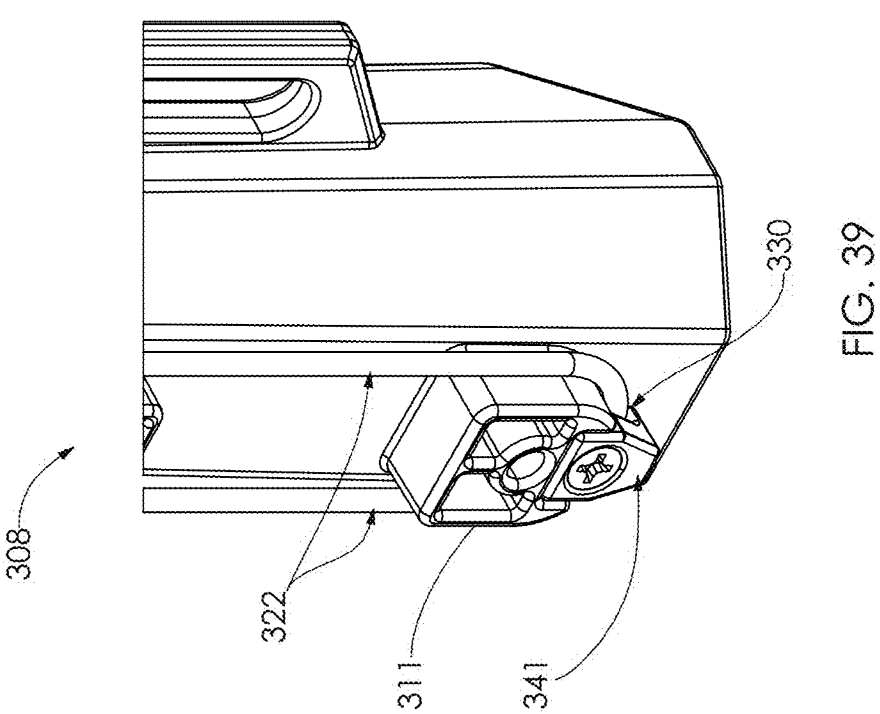
FIG. 39 is an enlarged partial rear perspective view of a lower portion of the rod holder showing a hook or passage through which a medial portion of the bungee may pass.
Figure 38:
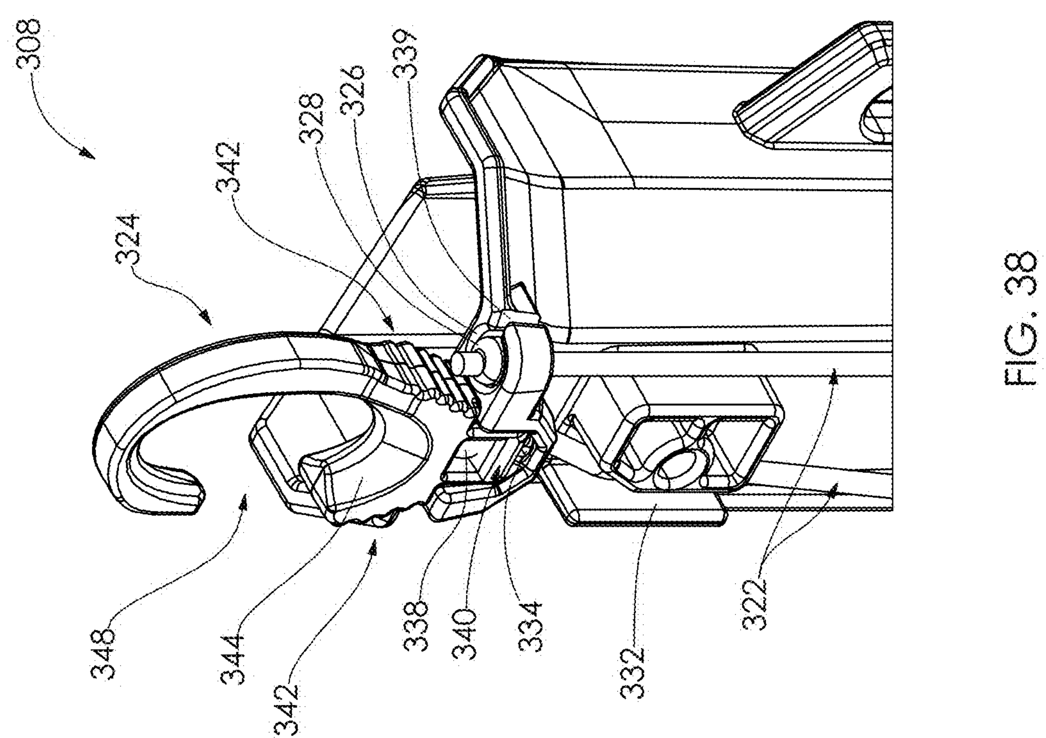
FIG. 38 is an enlarged partial rear perspective view of an upper portion of the rod holder showing an end of the bungee routed through an eyelet at one end of the rod holder and an opposing end of the bungee routed through a guide slot opposite the eyelet and the rod hook seat in a nesting feature thereof.
Figure 41:
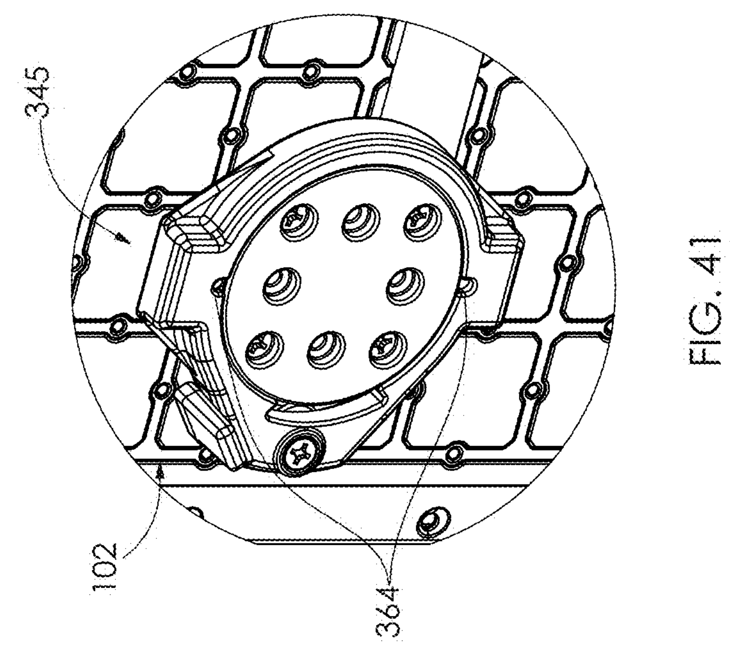
FIG. 41 is a perspective view of the crate with the rod holder turret mounted thereto.
Figure 40:
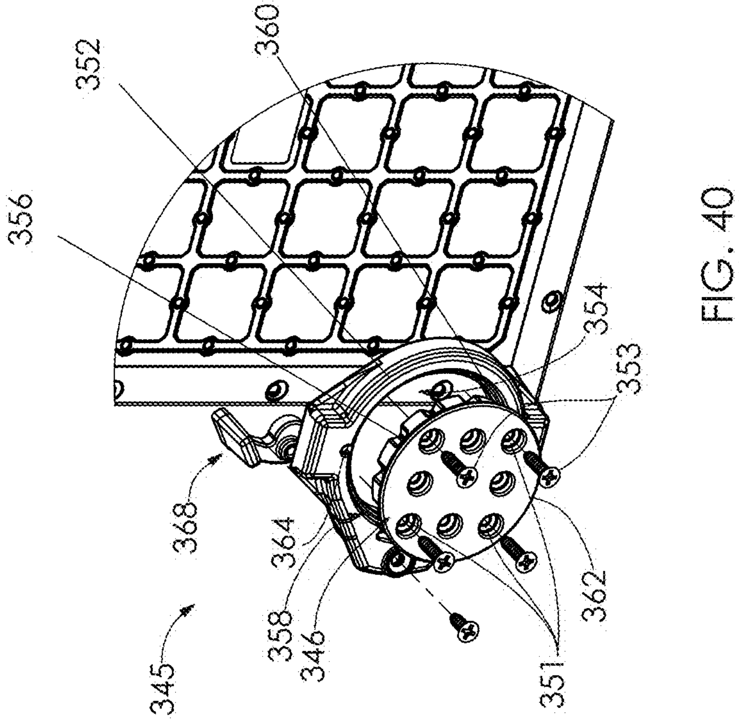
FIG. 40 is a perspective view of a portion of the crate with a rod holder turret exploded therefrom.
Figure 43:
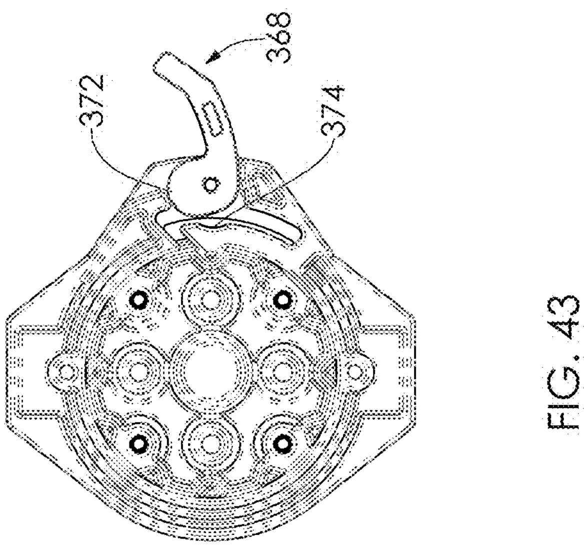
FIG. 43 is a front elevational view of the rod holder turret shown in FIG. 42, showing a locking feature unlocked with the lever in a locked position.

As shown in FIG. 35, one or more rod holders 308 may be attached to the side panels 102 at desired locations. This may be done in any suitable manner. Exemplary rod holders 308, shown in FIGS. 36-39, are provided with longitudinally spaced holes 310 (preferably tapered through holes), which are spaced to align with desired outer fastening holes 122 in the outer surface 120 of the side panels 102 of the crate 100. The exemplary rod holders 308 comprise four such holes 310, which extend perpendicularly through a rear wall 312 of the rod holders 308. Spacers 311 may extend from or otherwise be supported in relation to a rear surface of the rear wall 312. The spacers 311 may be integral with the outer surface of the rear wall 312 with the holes 310 passing therethrough to space the rod holders 308 apart from the outer surface 120 of the side panels 102 of the crate 100. The holes 310 are provided for the passage of threaded fasteners (e.g., flat head screws 316) (shown in FIG. 35) therethrough, for threading to desired outer fastening holes 122 to attach the rod holder 308 to the outer surface 120 of the side panels 102 of the crate 100. Openings 318 in a front wall 320 of the rod holder 308 may align with the holes 310 in the rear wall 312 of the rod holder 308 to provide access to the holes 310 in the rear wall 312 of the rod holder 308 and for passage of a screw 316 therethrough. One or more rod holders 308 may be fastened to side panels 102, as shown in FIG. 35. Exemplary positions for rod holders 308 are shown in FIG. 35. Positions may vary depending on the size of the side panels 102.

As shown in FIGS. 36-39, the rod holder 308 may be provided with a bungee 322, with a hook 324, to retain a fishing rod in the rod holder 308, to prevent the fishing rod from inadvertently escaping from the rod holder 308. In the illustrated embodiment, an upper end of the rod holder 308 is provided with an eyelet or passage 326 (shown in FIG. 38) through which the bungee 322 may pass and a recess, which may form a part of the eyelet 326, for capturing a knot 328 at one end of the bungee 322. A lower end of the rod holder 308 may be provided with a hook or passage 330 (shown in FIG. 39) through which the bungee 322 may extend down to and may pass through and return to the upper end of the rod holder 308, where the bungee 322 may pass through a guide slot 332 (shown in FIG. 38), which directs or guides an opposing end of the bungee 322 through a through hole 334 (shown in FIG. 38). The opposing end of the bungee 322 may be attached to or otherwise be supported in relation to the hook 324, such as by passing the end of the bungee 322 through a through hole 334 (shown in FIG. 38) in a lower end of the hook 324 [ ] and providing a knot 338 (shown in FIG. 38) in the opposing end of the bungee 322 to prevent the bungee 322 from escaping through the hole 334. The upper end of the rod holder 308 may further be provided with a nesting feature or structure 340 (shown in FIG. 38) in communication with the hole 334 dimensioned and configured to receive the lower end of the hook 324 for parking or storing the hook 324 out of the way when the hook 324 is not in use. It should be appreciated that the bungee 322 may be removed and stowed by removing the knot 328 from the eyelet 326 (via slot 339), passing the knot 328 through a passage 330 and the guide slot 332 and the through hole 334. To simplify removal and installation of the bungee 322, the passage 330 may be formed, for example, at least in part, by a hook 341 (shown in FIG. 39), which may nest or seat in a spacer 311 at the lower end of the rod holder 308. A fastener (shown but not referenced) may attach the hook 341 to the spacer 311 in the seated position. The hook 341 may be removed from the spacer 311 simply by removing the fastener. An exemplary bungee 322 is shown in its entirety in FIGS. 36 and 37.

A lower end of the rod holder 308 is preferably open to permit the passage of a fishing rod, or some portion thereof, therethrough. An upper end of the rod holder 308 may be provided with an opening, passage or slot for receiving the reel body near the foot of a fishing reel, to hold the fishing rod in an angular position (i.e., to prevent the fishing rod from rotating in relation to the rod holder (i.e., along a longitudinal axis of the rod holder). With a fishing rod in the rod holder 308, the hook 324 may be retrieved from the nesting structure 340 hooked around the fishing rod. The lower end of the hook 324 may have laterally opposed sides with serrated or knurled surfaces 342 (shown in FIG. 38) for ease of grip to control the hook 324. Opposing upper and lower ends of the hook 324 may be provided with chamfered inner surfaces 344 (shown in FIG. 38) to orient and engage the hook 324 with the hook keeper of a rod (not shown). A lateral side of the hook 324 may be provided with an opening or passage 348 (shown in FIG. 38) through which the rod may pass for engaging the hook 324 with the hook keeper. The bungee 322 maintains tension on the hook 324 to prevent the rod from escaping from the opening 348. To retrieve the fishing rod from the rod holder 308, the hook 324 is simply disengaged from the rod, at which point, the rod may escape from the opening 348 in the hook 324, the hook 324 may be nested in the nesting structure 340 and the rod may be lifted out of the rod holder 308. It should be appreciated that the hook 324 may alternatively be hooked on the fishing reel. Alternatively, the rod holder 308 may be provided with rails 350 (shown in FIG. 37) along opposing lateral sides thereof. The bungee 322 may be guided or wrapped around the fishing rod or fishing reel and guided to the rails 350 and the hook 324 may be hooked on the rails 350 to retain the rod in the rod holder 308. The rails 350 may also be provided for mounting tools and accessories.

Figure 42:
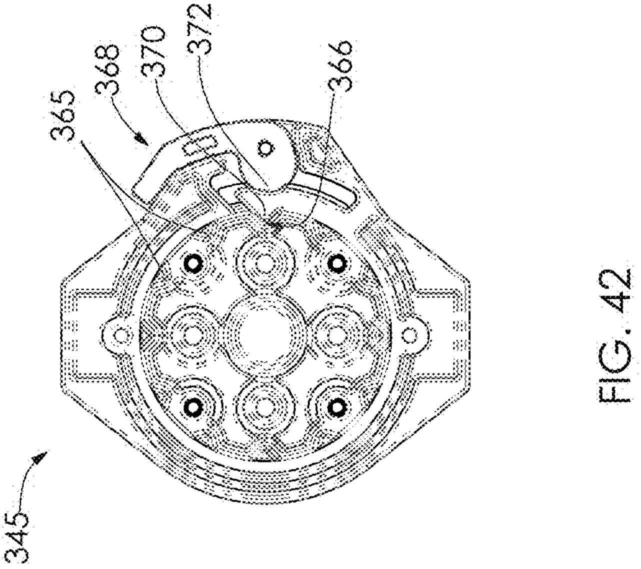
FIG. 42 is a front elevational view of the rod holder turret, showing a locking feature locked with a lever thereof in a locked position.
Figure 44:
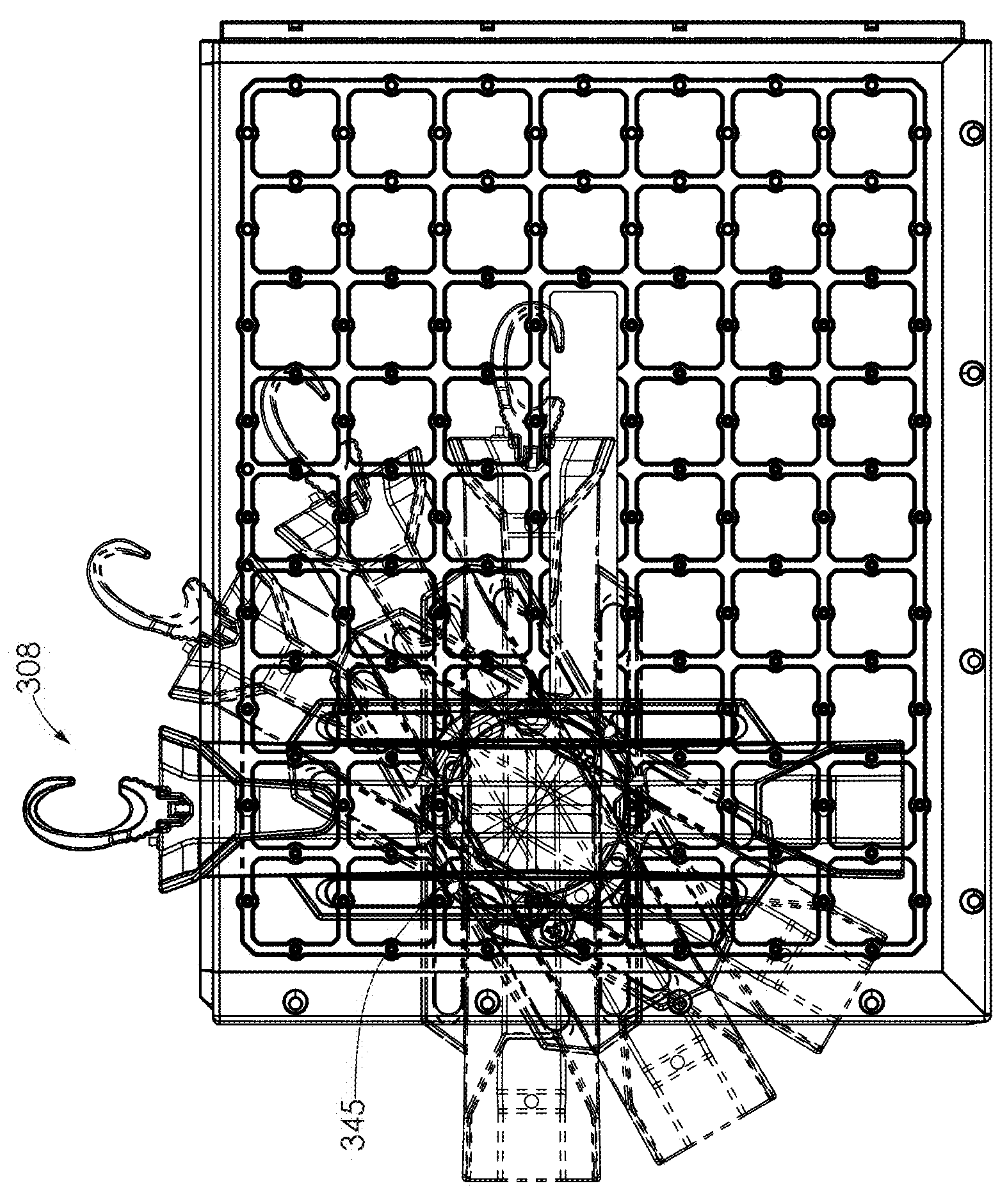
FIG. 44 is a front elevational view of the rod holder turret supporting a rod holder [ ] and adjusted to various positions.

It should be noted that the rod holder 308 may be supported for movement in relation to the crate 100. This may be accomplished in any suitable manner. An exemplary structure for supporting the rod holder 308 comprises a turret assembly 345, as shown in FIGS. 40-44. The turret assembly 345 may comprise a center plate 346 dimensioned and configured to be mounted to the outer surface 120 of a side panel 102. The center mount 346 may be comprised of a plurality of through holes 351, which may align with desired outer fastening holes 122 in the outer surface 120 of the side panels 102. The through holes 351 may be counterbored or otherwise recessed so that fasteners inserted therein may be recessed so as not to protrude to or beyond the outer surface 120. The center mount 346 may be mounted at various orientations due to the arrangement of the through holes 351 therein. The center mount 346 may be mounted to the outer surface 120 of a side panel 102 by fasteners, such as blunt tip screws 353 (shown in FIG. 40), which pass through desired through holes 351 and thread into outer fastening holes 122. The center mount 346 fits within, or otherwise cooperates with, an outer ring 352 (shown in FIG. 40) and rotates in relation to the outer ring 352. The outer ring 352 comprises a cylindrical central opening 354 for receiving the center mount 346, which comprises a cylindrical outer perimeter wall 356 (shown in FIG. 40) that mates or cooperates with a cylindrical inner perimeter wall 358 (shown in FIG. 40) defining the cylindrical central opening 354 of the outer ring 352. The outer ring 352 comprises a shoulder 360 (shown in FIG. 40) that extends radially inward from the cylindrical inner perimeter wall 358 of the outer ring 352 and the center mount 346 comprises a shoulder 362 (shown in FIG. 40) that extends radially outward from the perimeter wall 356 of the center mount 346. The shoulders 360, 362 cooperate to trap the outer ring 352 against the outer surface 120 of a side panel 102 when the center mount 346 is mounted to the side panel 102. The outer ring 352 comprises threadable or threaded fastening holes 364 (shown in FIGS. 40 and 41), which are spaced to align with any two adjacent through holes 262 in the rod holder 308 for attaching the rod holder 308 to the outer ring 352. The outer ring 352 is configured to rotate about the center mount 346 with the rod holder 308 attached to the outer ring 352. The outer ring 352 is configured to selectively stop at a plurality of positions in relation to the center mount 346 to selectively position the rod holder 308. This can be done in any suitable manner. However, in the illustrated embodiment, the cylindrical outer perimeter wall 356 of the center mount 346 comprises a plurality of circumferentially spaced detents 365 that cooperate with an interface structure 366 that is supported by the outer ring 352, as shown in FIG. 42. The interface structure 366 may be controlled by a lever 368 (shown in FIGS. 42 and 43) or other suitable control that, when actuated, disengages or otherwise permits disengagement of the interface structure 366 from a selected detent 365. In the illustrated embodiment, the interface structure 366 comprises a protrusion or tooth 370 that is selectively engageable with a detent 365 by actuating or otherwise controlling the lever 368. The lever 368 may provide support for rotating a cam 372, which may rotate into and engage a slot or recess or other suitable cam engaging surface 374 in the interface structure 366 opposite the tooth 370. Rotating the lever 368 in a first direction (e.g., in a counterclockwise direction when viewing FIG. 43) to a disengaged position rotates the cam 372 out of engagement with the cam engaging surface 374 to enable the tooth 370 to become disengaged from the detent 365 to permit the outer ring 352, and thus, the rod holder 308 to rotate. Rotating the lever 368 in a second direction, opposite the first direction, (e.g., in a clockwise direction when viewing FIG. 42) to an engaged position rotates the cam 372 into engagement with the cam engaging surface 374 to urge the tooth 370 into engagement with a selected one of the detents 365 to hold the outer ring 352, and thus, the rod holder 308 in a selected position.

It should be appreciated that a plurality of turret assemblies 345 may be mounted to the crate 100. Turret assemblies 345 may be mounted in tandem (i.e., harnessed side by side together) with a connecting rod or bar (not shown). With the lever 368 in the disengaged position, movement of one rod holder 308 causes rotation of the other rod holder 308. The rod holder 308 may be attached to the rod or bar by passing a fastener, such as a screw, through any one of the through holes 310 in the rod holder 308 and threading the fastener into a threadable or threaded hole in opposing ends of the rod or bar.

Figure 46:
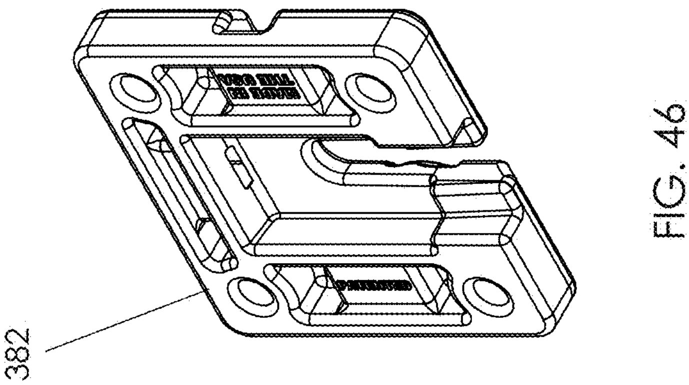
FIG. 46 is a bottom perspective view of the mount shown in FIG. 45.
Figure 45:
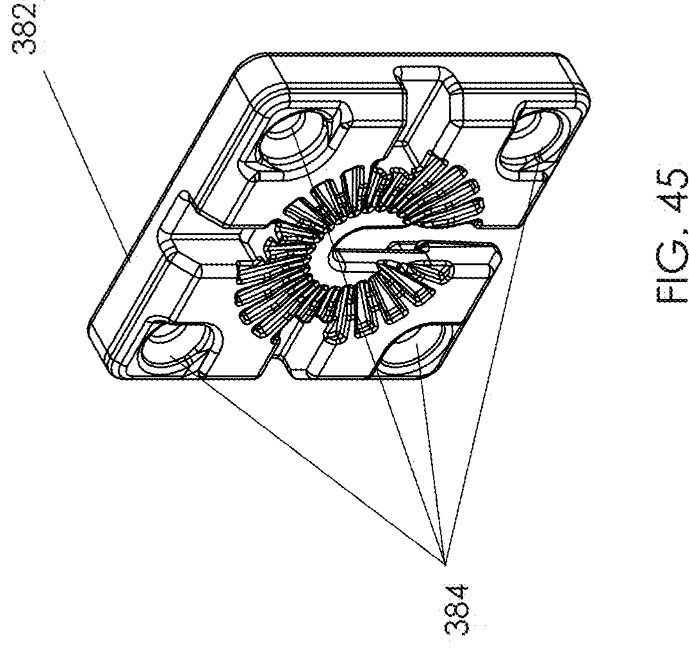
FIG. 45 is an enlarged top perspective view of a mount configured to fasten to the crate.

It should be appreciated that accessories and/or mounts (e.g., for ball mounts, cameras, cup holders, fish finders, lights, flags, oar holders, etc.) may be attached to the crate at desired locations by attaching the same to desired outer and/or inner fastening holes 122, 126 in the outer and/or inner surfaces 120, 124 of the side panels 102, or desired outer and/or inner fastening holes 204, 210 in the outer and/or inner surfaces 202, 206 of the top panel or lid 170. An exemplary mount 382 (shown in FIGS. 45-46) may be comprised of a substantially semi-symmetrical structure having mounting through holes 384 that are arranged to align with fastening holes 122, 126, 204, 210 for receiving fasteners, such as blunt tip screws (not shown), for fastening the mount 382 to the crate 100. Exemplary mounts may be comprised of mounts such as disclosed in U.S. Pat. No. 9,863,576, issued Jan. 9, 2018, and may include discrete mounting positions, such as disclosed in U.S. Pat. No. 9,863,576, issued Jan. 26, 2021, and U.S. Pat. No. 11,333,298, issued May 17, 2022, the disclosures of which are incorporated herein by reference in their entirety. The term "mounts" further comprises mounting tracks, such as disclosed in U.S. Pat. No. 9,671,060, issued Jun. 6, 2017, U.S. Pat. No. 9,828,073, issued Nov. 28, 2017, U.S. Pat. No. 9,879,819, issued Jan. 30, 2018, U.S. Pat. No. 10,435,117, issued Oct. 8, 2019, U.S. Pat. No. 10,967,939, issued Apr. 6, 2021, U.S. Pat. No. 10,900,607, issued Jan. 26, 2021, and U.S. Pat. No. 11,333,298, issued May 17, 2022, the disclosures of which are incorporated herein by reference in their entirety.

It should be appreciated that the outer surface 120 of the side panels 102 may be provided with rules or guides 388 (shown in FIG. 1) or other indicia to permit ease of attachment of crate components, or parts and/or accessories to the crate 100. The illustrated crate 100 is embossed or etched with rules or guides 388 that are arranged to define a grid pattern with points of intersection at fastening holes 122, 204. The lattice structure 125, 154 may likewise define a grid pattern with points of intersection at fastening holes 126, 210.

Figure 48:
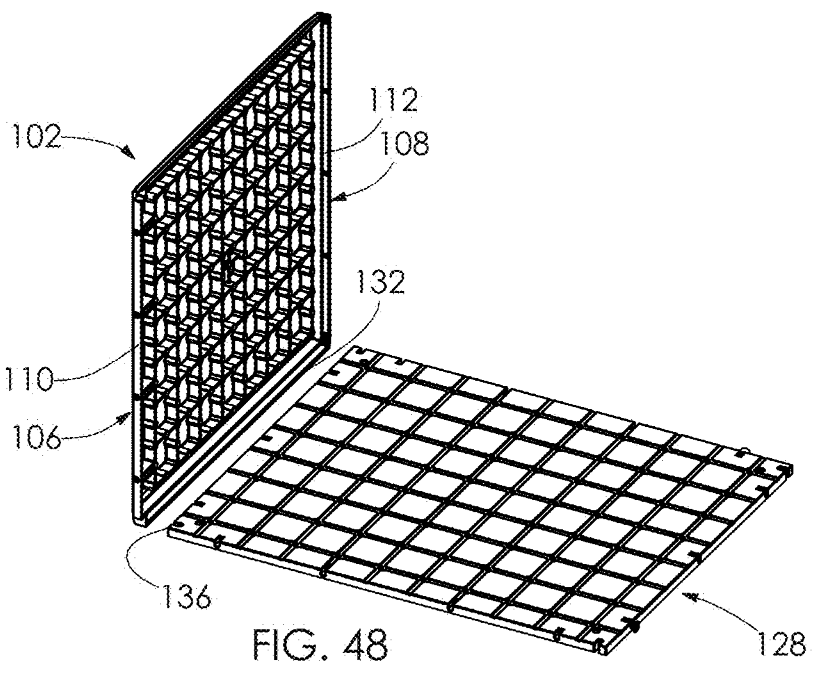
FIG. 48 is a reduced scale, exploded perspective view of a bottom panel and a side panel of the crate.
Figure 49:
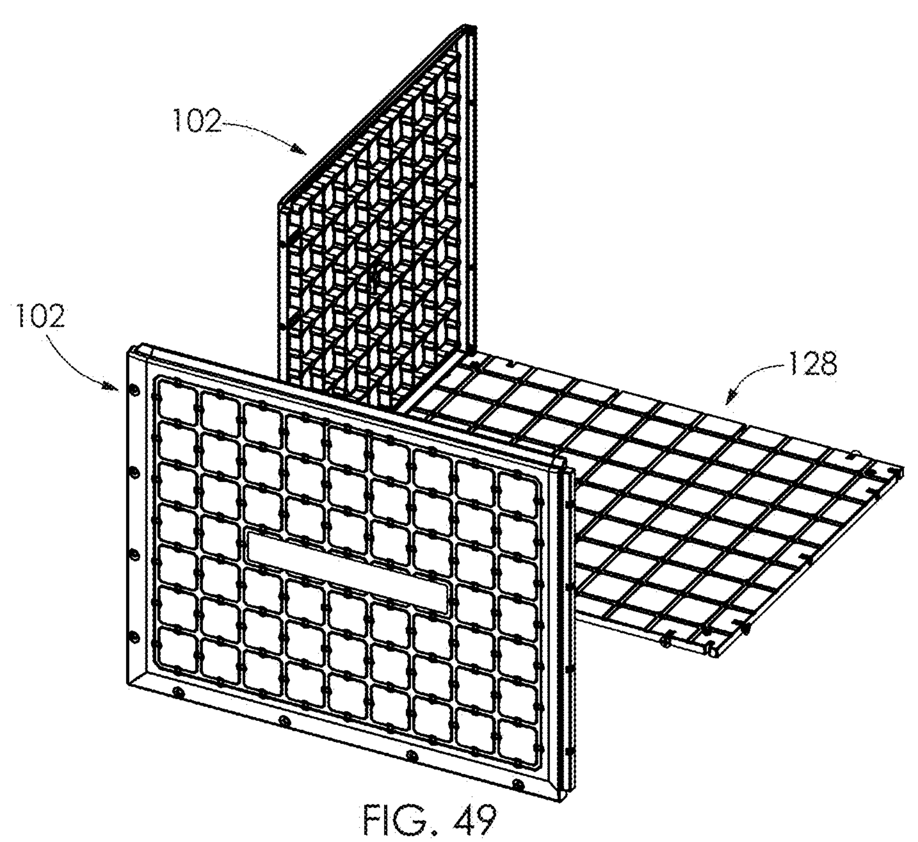
FIG. 49 is a perspective view of the bottom and side panels shown in FIG. 48 assembled, with an additional side panel exploded therefrom.
Figure 50:
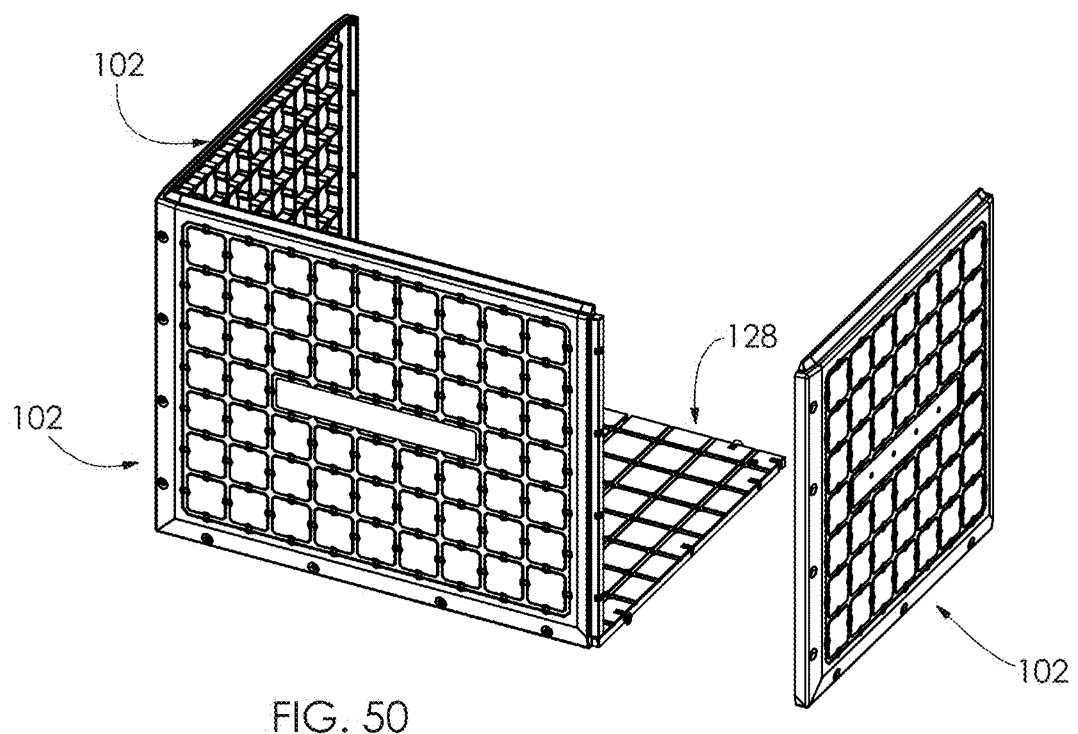
FIG. 50 is a perspective view of the bottom and side panels shown in FIG. 49 assembled, with an additional side panel exploded therefrom.
Figure 51:
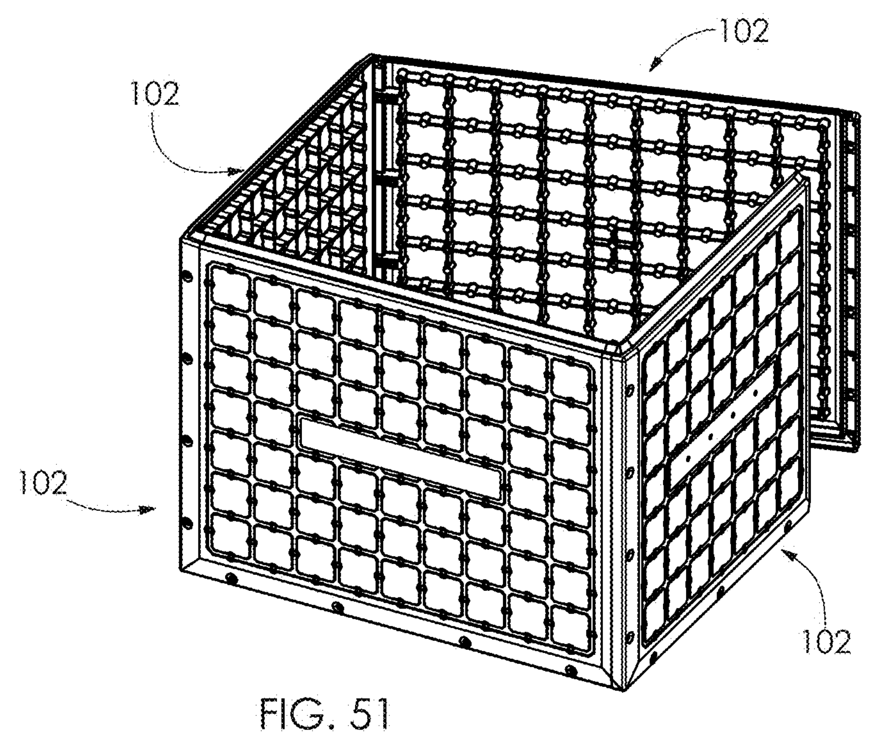
FIG. 51 is a perspective view of the bottom and side panels shown in FIG. 50 assembled, with an additional side panel partially exploded therefrom.
Figure 52:
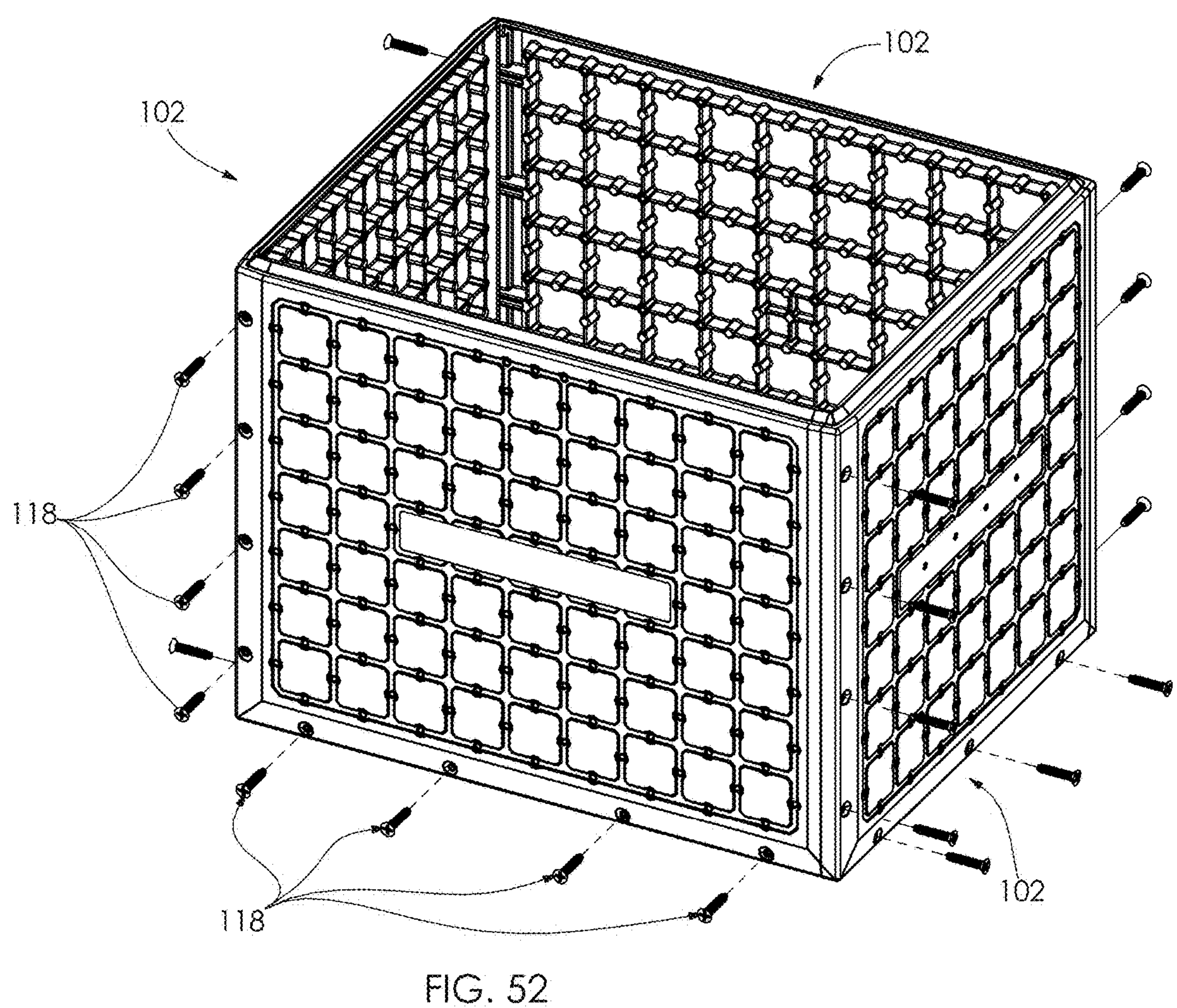
FIG. 52 is an enlarged perspective view of the side panels shown in FIG. 51 forming an enclosure, with fasteners for fastening the bottom and side panels together.

As shown in FIG. 47, a method for assembling a crate 100 may comprise the step 400 of providing a bottom panel 128 having perimeter edge or side edges 136. In step 402, side panels 102 are provided each having opposing side edges 106, 108 and a male member or tongue 110 and a female member or groove 112 along respective ones of the side edges 106, 108, and a bottom edge 132 and a female member or groove 134 along the bottom edge 132, as shown in FIG. 48. The bottom edge 132 of the side panel 102 may be provided with a notch or slot 142 that may align with a tab 140 along the side edge 136 of the bottom panel 128 (referenced in FIG. 8). In step 404, one of the side panels 102 is initially installed by inserting one of the side edges 136 of the bottom panel 128 into the female member or groove 134 extending along the bottom edge 132 of the side panel 102, with the side panel 102 substantially at a right angle to the bottom panel 128, to form a corner 130 (referenced in FIGS. 1 and 3) between the bottom panel 128 and the side panel 102, as illustratively represented in FIG. 48. The bottom edge 132 of the side panel 102 may be provided with a notch or slot 142 that may align with a tab 140 along the side edge 136 of the bottom panel 128 to align the side panel 102 with the bottom panel 128 (referenced in FIG. 8). In step 406, the insertion step 404 is repeated with another or newly installed side panel 102, shown in FIG. 49, and the male member or tongue 110 along the side edge 106 of the previously installed side panel 102 in step 402 is also inserted into the female member or groove 112 along the side edge 108 of the newly installed side panel 102 in step 406 until the male member or tongue 110 is seated into the female member or groove 112 to form a side corner 104 (referenced in FIG. 1), between the side panels 102. In step 408, step 406 is repeated with additional side panels 102 to form an enclosure, as illustratively represented in FIGS. 50 and 51. For ease of assembly, the male member or tongue 110 along the side edge 106 of the newly installed side panel 102 may be first inserted into the female member or groove 112 along the side edge 108 of the initially installed side panel 102 in step 404 (to the left when viewing FIG. 51) and the male member or tongue 110 along the side edge 106 of the previously installed side panel 102 may be inserted into the female member or groove 112 along the side edge 106 of the newly installed side panel 102 (in a direction toward the viewer of FIG. 51). In step 410, the panels 102, 128 may be secured together with fasteners 118 that may pass through side panels 102 at the bottom and side corners 130, 104 and thread into the bottom panel 128 and adjacent side panels 102, as illustratively represented in FIG. 52. Of course, the panels 102, 128 may be secured together at various stages of assembly. For example, adjacent side panels 102 may be secured together at each step 406 upon securing adjacent panels 102 together, and the side panels 102 may be secured to the bottom panel 128 in step 410 to complete the assembly.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

PARTS LIST

100 crate
102 side panels
104 side corners
106 side edges
108 side edges
110 male member or tongue
112 female member or groove
114 through holes
116 threadable structures
118 screw
120 outer surface
122 outer fastening holes
124 inner surface
125 lattice structure
126 inner fastening holes
128 bottom panel
130 bottom corners
132 adjacent bottom edges
134 female member or groove
136 perimeter edge or side edges
140 tab
142 notch or slot
144 through holes
146 threadable structures
148 upper surface
150 inner fastening holes
152 lower surface
154 lattice structure
156 threaded or threadable boss
158 foot
160 screw
162 flat washer
164 through hole
165 recess
166 through hole
168 notch
170 top panel or lid
172 inner sloped or angled surface
174 ridge
175 perimeter edge or side edges
176 complementary inner sloped or angled surface
178 ridge
180 top edge
182 opening
184 angled outer perimeter surface
186 stop or interface
190 bumpers
192 main body portion
194 through hole
196 boss or pin
198 semi-circular or semi-cylindrical structure
200 laterally spaced fingers
202 outer surface
204 outer fastening holes
206 inner surface
208 lattice structure
210 inner fastening holes
212 hinges
214 leaf
216 leaf
218 knuckle
220 pin
222 fasteners
224 through holes
226 through holes
227 nut
228 tabs
230 ridge
232 latch assemblies
234 catch
236 latch
238 fasteners
240 through hole
242 upwardly exposed laterally extending groove
244 laterally extending bar
245 tab
246 tab
248 mounting bracket
249 latch member
250 tabs
252 laterally extending bar or pivot pin
254 detents or notches
256 radially extending surfaces
258 recesses
260 handles
262 through holes
264 fasteners
266 opening, passage or slot
268 corner brackets
270 inner mounting structure
272 adjacent walls
274 clearance slot
276 outer lattice structure
278 outer walls
280 distal structure
282 countersunk through hole
284 fasteners
286 outer opening, passage or slot
288 cantilevered end
290 laterally spaced intermediate openings or passages
291 tether or bungee, or a hook or carabiner
292 bungees
296 attachment structure
298 large opening
300 keyhole slot
302 slot
304 tapered through hole
308 rod holder
310 longitudinally spaced holes
311 spacer
312 rear wall
316 screw
318 openings
320 front wall
322 bungee
324 hook
326 eyelet or passage
328 knot
330 hook or passage
332 guide slot
334 through hole
338 knot
339 slot
340 nesting feature or structure
341 hook

342 serrated or knurled surfaces
344 chamfered inner surfaces
345 turret assembly
346 center mount
348 opening or passage
350 rails
351 through holes
352 outer ring
353 screws
354 cylindrical central opening
356 cylindrical outer perimeter wall
358 cylindrical inner perimeter wall
360 shoulder
362 shoulder
364 threadable or threaded fastening holes
365 circumferentially spaced detents
366 interface structure
368 lever
370 protrusion or tooth
372 cam
374 slot or recess or other suitable cam engaging surface
382 mount
384 mounting through holes
388 rules or guides

What is claimed is:

1. A crate comprising side panels each comprising a tongue along one side edge and a groove along an opposing side edge, wherein the tongue of each one of the side panels cooperates with the groove on an adjacent one of the side panels so that the side panels may be successively joined together to form a perimeter wall of the crate, and a top panel comprising an outer peripheral underside edge configured to cooperate with a chamfered surface of a top edge of the side panels to form a seal between the top panel and the side panels.

2. The crate of claim 1, further comprising a bottom panel having side edges, the side panels each further comprising a groove along a bottom edge that interfaces with a corresponding one of the side edges of the bottom panel.

3. The crate of claim 2, wherein the side panels each further comprise a notch at a terminal end of the bottom edge for receiving a tab at a terminal end of a corresponding one of the side edges of the bottom panel for aligning the side and bottom panels.

4. A crate comprising side panels joined together to form a perimeter wall of the crate and a top panel comprising an outer peripheral underside edge configured to cooperate with a chamfered surface of a top edge of the side panels to form a seal between the top panel and the side panels.

5. The crate of claim 4, wherein the top panel further comprises an outer peripheral top edge that is sloped to direct environmental fluids away from the side panels.

6. The crate of claim 4, wherein the outer peripheral underside edge is further configured to cooperate with the top edge of the side panels to form an interlock therebetween.

7. A crate comprising side panels joined to form a perimeter wall of the crate and bumpers each comprising a hole that cooperates in a snug-fit relationship with a boss protruding from an underside of the top panel for attaching the bumpers to the top panel, the bumpers being configured to mitigate or prevent surface-to-surface contact between the top panel and the side panels.

8. The crate of claim 7, wherein the bumpers are shaped to comport with a complementary shape of the underside of a top panel to result in a mating engagement that holds that bumpers in place in relation to the top panel.

9. The crate of claim 7, wherein the bumpers comprise cantilevered fingers that flex to provide a resilient interface between the bumpers and the top panel.

10. A crate comprising side panels joined together to form a perimeter wall of the crate, a bottom panel interfacing with a bottom edge of the side panels, and a top panel that cooperates with a top edge of the side panels, wherein at least one panel of the side, top or bottom panels comprises superimposed patterns of outer fastening holes and inner fastening holes that extend only partially through the at least one panel, so that the at least one panel is impervious to liquids.

11. The crate of claim 10, wherein at least one panel further comprises a lattice structure, the inner fastening holes supported at intersections of the lattice structure.

12. The crate of claim 11, wherein the lattice structure defines a grid pattern, with the inner fastening holes at points of intersection of the grid pattern.

13. The crate of claim 12, wherein at least one panel further comprises an outer surface comprising guides that are arranged to define a grid pattern that is superimposed in relation to the superimposed patterns of the outer fastening holes and the inner fastening holes and the grid pattern defined by the lattice structure.

* * * * *